United States Patent [19]
Monta et al.

[11] Patent Number: 5,559,691
[45] Date of Patent: Sep. 24, 1996

[54] PLANT CONDITION DISPLAY SYSTEM

[75] Inventors: Kazuo Monta, Yokohama; Juichiro Itoh, Kawasaki, both of Japan

[73] Assignee: Kabushiki Kaisha Toshiba, Kawasaki, Japan

[21] Appl. No.: 248,142

[22] Filed: May 24, 1994

[30] Foreign Application Priority Data

May 26, 1993 [JP] Japan .................. 5-124464

[51] Int. Cl.$^6$ .................................................. G21D 1/00
[52] U.S. Cl. .......................................... 364/188; 376/216
[58] Field of Search ................................... 364/188–191, 364/492, 494, 527, 550, 148; 376/216, 217, 259; 395/161

[56] References Cited

U.S. PATENT DOCUMENTS

| H289 | 6/1987 | Beltracchi | 364/492 |
|---|---|---|---|
| 4,421,716 | 12/1983 | Hench et al. | 376/216 |
| 4,608,223 | 8/1986 | Twilley, Jr. | 364/188 |
| 4,675,147 | 6/1987 | Schaefer et al. | 364/188 |
| 4,815,014 | 3/1989 | Lipner et al. | 364/550 |
| 5,267,278 | 11/1993 | Scarola et al. | 376/259 |
| 5,353,400 | 10/1994 | Nigawara et al. | 395/161 |

*Primary Examiner*—Roy N. Envall, Jr.
*Assistant Examiner*—Steven R. Garland
*Attorney, Agent, or Firm*—Foley & Lardner

[57] ABSTRACT

A plant condition display system for displaying items of information regarding a plant operation for an operator comprises a process signal input device into which process values are inputted from a plant and converted therein into process signals, a display data preparation device for preparing data for displaying plant conditions in response to the process signals from the process signal input device, and a plant condition information display device for representing process information of the plant in accordance with plant condition display data from the display data preparation device and then displaying the represented process information on a display screen. The plant condition information display device is a display device for displaying plant start up conditions or a decay heat removal operation condition during a plant shutdown.

12 Claims, 19 Drawing Sheets

PLANT CONDITION DISPLAY SYSTEM

BACKGROUND OF THE INVENTION

The present invention relates to a system for displaying plant conditions for providing information to an operator who is carrying out a plant operation by utilizing a computer or computing system, particularly to a plant condition display system for providing plant information suitable for information processing or decision making carried out by a human such as an operator of the plant.

In the operation of a large plant such as a nuclear power plant which involves numerous items of information and which requires safety, the role of an operator or operators is important. Particularly, in view of their serious effect on the plant, problems caused by humans such as errors in control and the methods of their prevention are most important.

An plant operator comprehends the present condition or state of the plant on the basis of information from plant information display instruments on a control board or panel (hereinafter referred to as plant condition comprehension) and accordingly carries out control operation required for the running of the plant. In such operation, an unexpected result may arise in some cases through an erroneous operation due to a simple mistake or insufficient plant condition comprehension of the operator. This latter cognitive insufficiency is caused by the difficulty of the operator to judge only in his mind, the mutual relationships between the items of information obtained from conventional display instruments or the like such as meters and recorders.

In order to prevent such erroneous operations due to the insufficient plant condition comprehension of the operator, there is provided means for displaying, on a CRT (cathode ray tube) screen, the operating conditions of the plant equipment, which has been generally called a P&ID screen for displaying the operating conditions of the plant equipment.

In the information display by such a P&ID screen, it is possible to display individual conditions of each of the items of equipment constituting the plant, but it is insufficient for a total comprehension of the plant condition in all cases. For example, it is insufficient to transfer the information with respect to a secondary influence or effect between subsystems mutually related in a complicated manner. That is, prime importance is given to the detailed and accurate transmission of individual elements and information for totally grasping surrounding conditions, reasons and objects is insufficient. For the reasons described above, it becomes difficult to clearly comprehend an image of the total condition or state of the plant. Accordingly, the conventional P&ID screen type display merely shows in what condition the plant is, and it is necessary for the operator to think out in his mind highly abstractive conceptional information such as the goal condition of the plant and effects resulting from the present state of the plant.

As described above, it can be said that the conventional system or method of displaying the present state of the plant is insufficient for displaying the items of information suitable for the cognition or perception of operators. Accordingly, plant supervisory control errors may occur due to such insufficient comprehension of the plant condition or incomplete estimation of the plant condition, which will significantly adversely affect the plant operation. Particularly, in a condition where the work load of an operator required for recognizing and diagnosing an abnormal condition becomes high, the operator, with high possibility, searches and recalls an information pattern which is most similar to the subject problem and was encountered in his past experience and adapts the treatment or countermeasure which was utilized in the past experience. As a result, an important information may be overlooked or misunderstood as a similar case which occurred in the past.

SUMMARY OF THE INVENTION

An object of the present invention is to substantially eliminate the defects or drawbacks encountered in the prior art and to provide a plant condition display system capable of displaying information of a plant suitable for the processing of the information for solving problems of a human such as an operator, of displaying the plant condition with high representation not dependent on hardware such as equipment of the plant, and of enabling the operator to intuitively recognize the principle and law underlying the plant physical process through the display, whereby the mechanisms for realization of the plant objectives can be made clear and erroneous judgement of the operator can be prevented to thereby prevent unnecessary trouble for the plant.

These and other objects can be achieved according to the present invention by providing a plant condition display system for displaying for an operator items of information regarding the operation of a plant, comprising:

a process signal input means into which process values from the plant are inputted from a plant and converted therein into process signals;

a display data preparation means for preparing data for displaying plant condition in response to the process signals from the process signal input means; and a plant condition information display means for representing process information of the plant in accordance with the plant condition display data from the display data preparation means and then displaying the represented process information on a display screen.

In one preferred embodiment of the invention, the plant condition information display means is a display means for displaying the operational status in the start up mode of the plant. This plant starting condition display means includes means for displaying, as image representations, flows of substances and energy at the plant starting time and an energy balance at the main part of the plant on a display screen and means for displaying, as image representations, the principle and law governing an operating fluid with respect to a steam cycle on a display screen. The plant starting condition display means includes means for displaying, as image representations, the main functions of the total energy production and conversion processes at the plant starting time on a display screen and means for displaying, as image representations, conditions of supports of the main functions on a display screen. The main function display means and the support display means are provided with a core heat generation display section, a reactivity condition display section as a support thereof, a heat energy transfer function display section, a main steam pressure condition display section as a support thereof, a heat-mechanical energy conversion display section, a condenser vacuum condition display section as a support thereof, a power generation function display section, a turbine generator rotational speed condition display section, a heat removal function display section, a circulation water flow rate condition display section as a support thereof and an exhaust heat display section.

The plant starting condition display means is provided with a display screen to which a window for displaying an advancing condition of main phases at the start up is provided.

The plant start up condition display means includes a means for displaying, as image representations, energy flow and energy balances in the plant on a display screen. The energy flow and energy balance display means in the plant is provided with a display section for displaying a main process variable in a reactor core, an energy balance display section for displaying an energy balance between an energy inputted into and an energy outputted from the reactor vessel, a turbine heat engine cycle display section and an energy sink display section for displaying electric power and exhaust heat.

The plant starting condition display means includes means for displaying, as image representations, a reactor vessel mass balance and a condenser mass balance on a display screen.

In another preferred embodiment of the invention, the plant condition information display means is a display means for displaying a decay heat removal operation condition at a plant shutdown mode. The decay heat removal operation condition display means includes a display means for displaying, as image representations, flows of substances and energy and the balance condition thereof in a decay heat removal operation condition at a plant shutdown mode on a display screen and a display means for displaying, as image representations, the principle and law governing an operating fluid with respect to the thermohydrodynamic behavior on a display screen. The decay heat removal condition display means includes a means for displaying, as image representations, energy flow and energy balances in the plant on a display screen. The energy flow and energy balance display means in the plant is provided with a display section for displaying a main condition variable in a reactor vessel, an energy balance display section for displaying an energy balance between an energy inputted into and an energy outputted from the reactor vessel, a display section for displaying the thermohydrodynamic behavior and the energy balance in the primary containment vessel and a display section for displaying the thermohydrodynamic behavior and the energy balance in a turbine main condenser.

The decay heat removal condition display means includes a display means for displaying, as image representations, water-steam flow and mass balance thereof in the entire plant for realizing an energy flow in the plant. The display means for displaying the water-steam flow and the mass balance thereof is provided with a reactor vessel mass balance display section, a primary containment vessel (PCV) mass balance display section, a pure water storage tank mass balance display section and a condenser mass balance display section.

According to the present invention, in one preferred embodiment, at the plant start up mode with the aim of achieving energy generation and conversion processes as the main object of the plant, the conditions of the necessary main functions and their supports are displayed as image representations and, also, the flows of the substance and energy and their balance condition and the principle and law governing the operating fluid with respect to the steam cycle are displayed as image representations. Therefore, it becomes possible to display the information fully suitable for cognitive process of human problem solving, and different from the display merely of a condition of a machinery in the conventional technology, it becomes unnecessary for the operator to think out conceptional information of high abstraction such as reasons which cause the present condition of the plant, the condition of the plant and goal condition to be attained from the present condition of the plant.

In another preferred embodiment of the invention, in the process monitoring and controlling of the decay heat removal operation with the object mainly of maintaining the soundness of the plant at the plant shutdown time, the conditions of the necessary functions and their supports are displayed as image representations and, also, the flows of the substances and energy and their balance condition and the principle and theory governing the operating fluid with respect to the thermohydrodynamic behavior are displayed as image representations. Therefore, it becomes possible to display the information fully suitable for processing the information for solving the human problem, and different from the display merely of a condition of a machinery in the conventional technology, it becomes unnecessary for the operator to think out conceptional information of high abstraction such as reasons which cause the present condition of the plant the condition of the plant and the goal condition to be attained from the present condition of the plant.

The nature and further features of the present invention will be made more clear hereunder through description made with reference to the accompanying drawings.

DESCRIPTION OF THE PREFERRED EMBODIMENTS

Embodiments of the present invention will be described hereunder with reference to the accompanying drawings.

Figure 1:
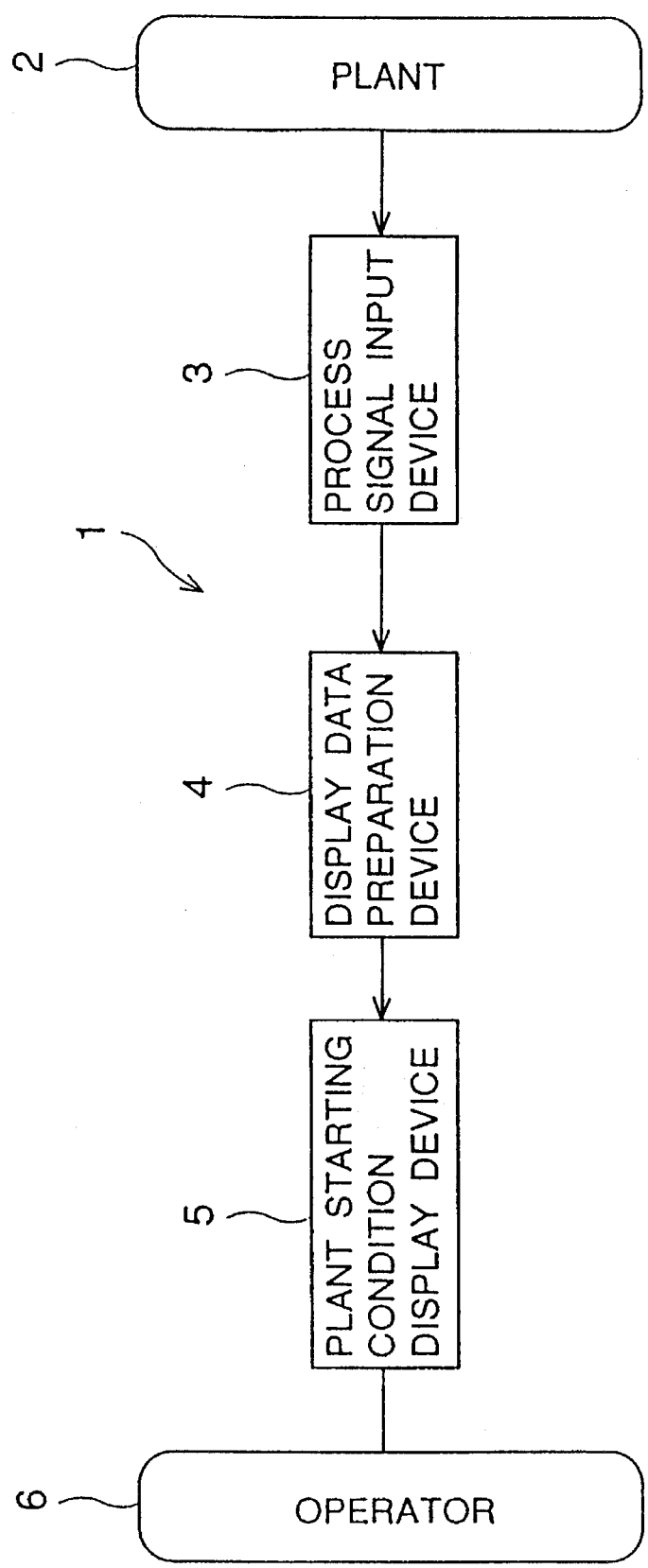
FIG. 1 is a block diagram representing the composition of a plant condition display system according to a first embodiment of the present invention.

First, reference is made to FIG. 1 showing a block diagram representing a display system for displaying a condition of a plant, such as a nuclear power plant. According to a first embodiment of the present invention, the plant condition display system of this embodiment is a display system for displaying a plant starting condition. The plant condition display system 1 comprises a process signal input device 3 into which process signals are inputted from the plant 2, a display data preparation device 4 for preparing display data in response to the process signals and a plant starting condition display device 5 for preparing a display screen or scope in accordance with the display data prepared by the display data preparation device 4. An operator 6 monitors and recognizes the display screen of the display device 5 and judges, with ease, the plant condition.

The screen display method of the plant start up condition display device 5 is performed in the following manner.

Figure 2:
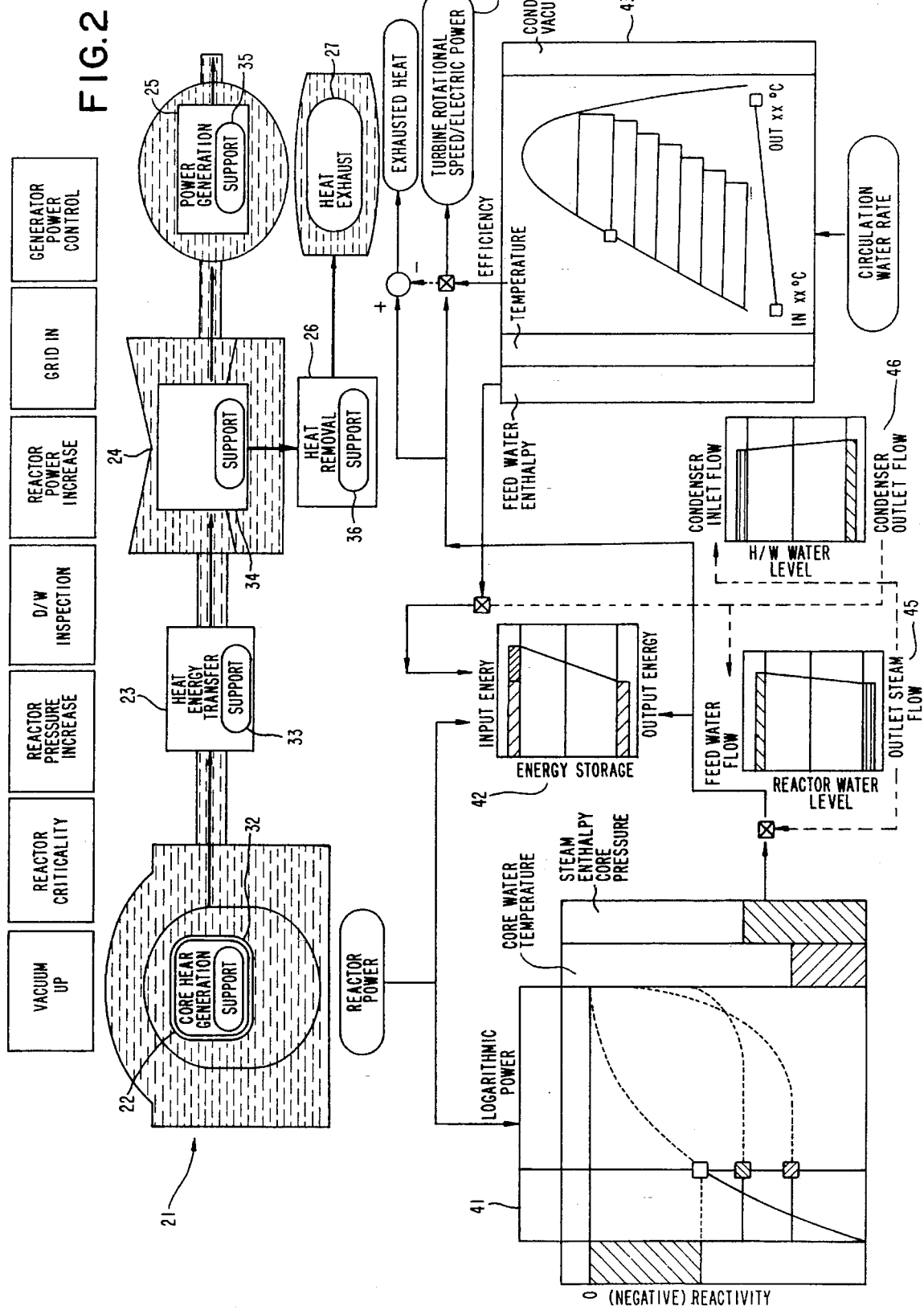
FIG. 2 is a diagram of one example of a display screen in the system of FIG. 1.

With reference to FIG. 2 representing a display screen example as a display method in which items of process information of the plant are directly expressed by way of mass and energy flows and their balance condition, and principle and law governing the operating fluid with respect to a steam cycle as a basic process of a power generation plant. Although the display screen includes for displaying, in representation, the main functions of energy production and energy conversion processes at the plant start up mode and their support processes, these representations are in nature independent, and therefore, in the following, a display screen example of the former is first described and that of the latter will be next described.

This screen displays a relation of cause and effect at the structure/function level of the plant by conceptual information of high abstraction level, and it is expected that the operator directly recognize change and control conditions of plant performance.

Windows are provided for an upper portion of the display screen for displaying advancing conditions of main phases at the plant starting time, and the windows are utilized for displaying in color the fact that the respective phases have already been achieved, are now achieved, or have not been achieved. In addition, it is possible to display whether the respective phases are in normal or abnormal conditions.

On a screen portion lower than the location of the windows, there are arranged a portion showing energy flow and energy balance in the plant and a portion showing mass balance of water in the whole plant.

The portion showing energy flow and balance includes a display section 41 for displaying variables of the main conditions in a core of a reactor plant, an energy balance display section 42 for displaying the balance between input energy and output energy of the reactor pressure vessel (RPV), a turbine heat engine cycle display section 43, and an energy sink display section 44 for displaying electric power and exhaust heat. This portion also shows mutual relationships among these display sections. In FIG. 2, a thick solid line denotes an energy flow, a thin solid lime denotes an enthalpy flow, and a dotted line denotes a water or steam flow. This portion also includes a display section displaying mass-flow and balance supporting the energy generation and conversion processes and being composed of a reactor vessel mass-balance display section 45 and a condenser mass-balance display section 46.

Figure 3:
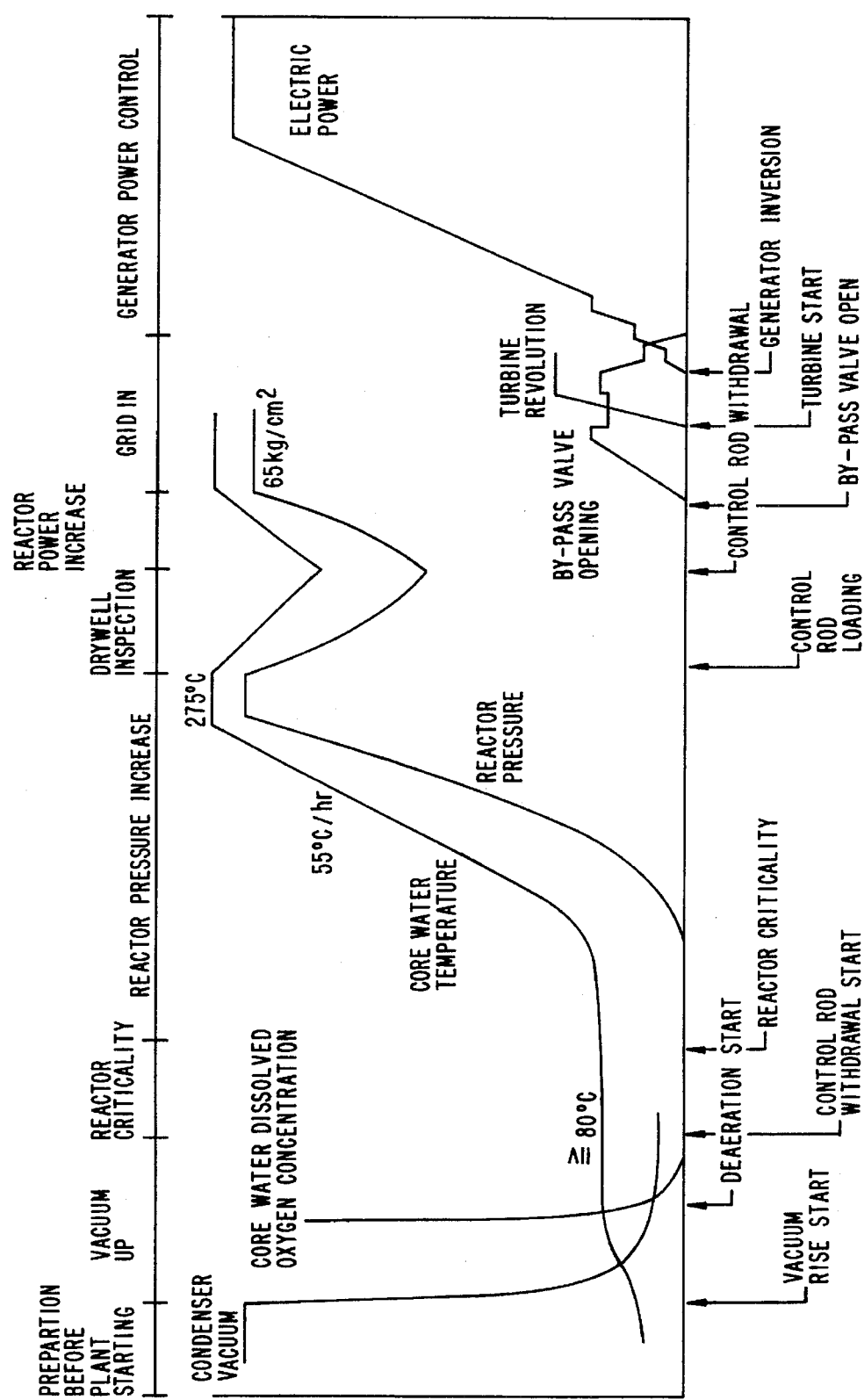
FIG. 3 is a chart showing changes with elapsed time of typical plant condition variables at a plant start up mode.

The manner in which the plant running condition is displayed in the respective phases at the plant starting time will be described hereunder reference to FIG. 2. FIG. 3 is a chart showing the change with time of typical plant variables at the plant starting time.

(1) Vacuum up phase

Figure 4:
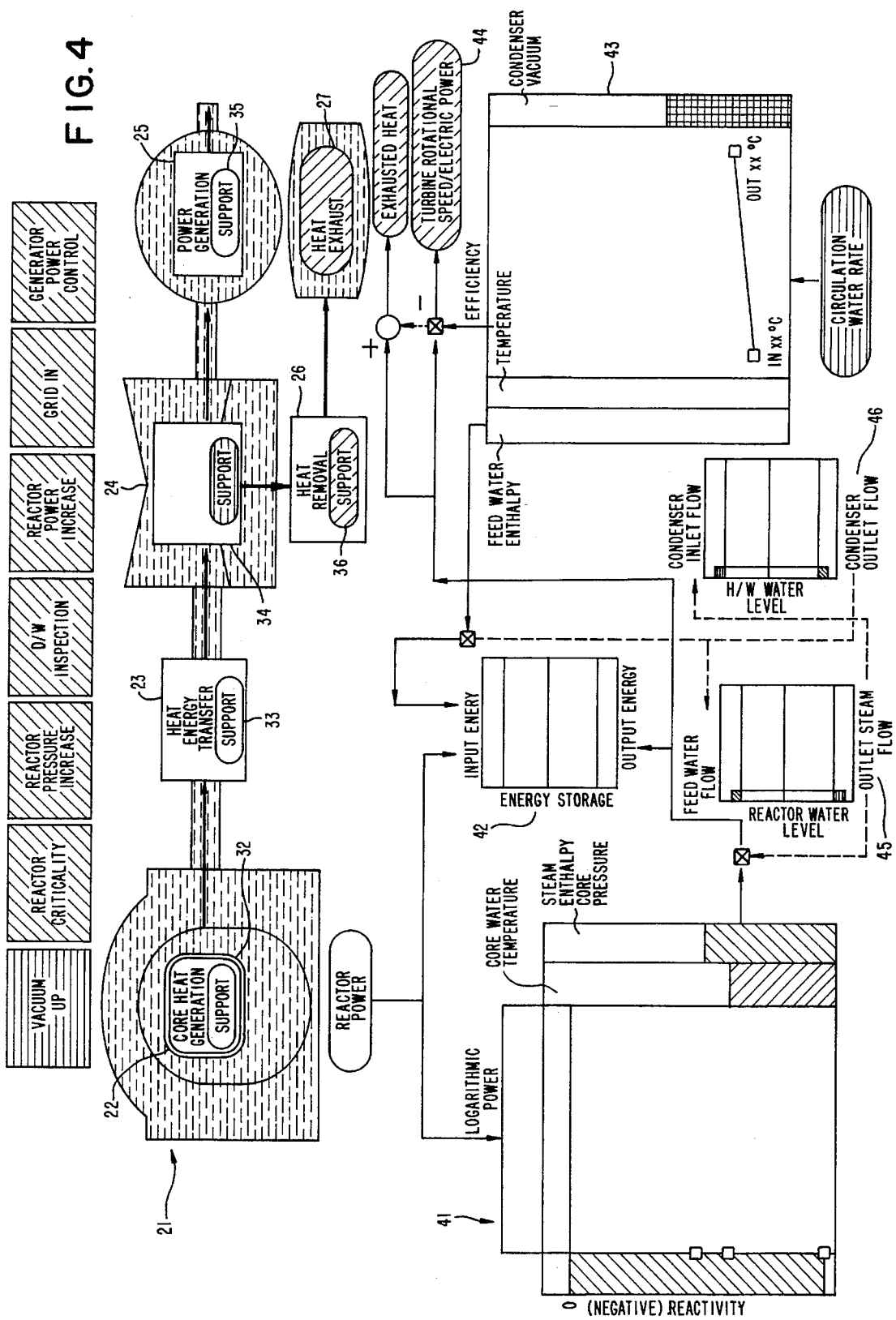
FIG. 4 is a diagram showing one display example at a condenser vacuum up phase of the display screen of FIG. 2.

When the operator selects this phase for increasing the vacuum from a plant cold shutdown state as shown in FIG. 4, an object for this phase is to complete the increasing of the vacuum, and the display color of a window representing the vacuum increase of the screen of this phase is changed from a brown color to a blue color, for example.

In this phase, first, in order to establish a heat sink of the plant, a vacuum increase of the condenser and a reactor deaeration are performed. The vacuum of the condenser is displayed on the turbine heat engine cycle display section 43. The turbine is now in the shutdown condition, and a Rankine cycle is not displayed. On the other hand, in the core, control rods are in full-inserted state, and a reactivity display of the core main variable display section 41 displays full subcriticality, and a logarithmic display of the reactor power output shows a very low state as shown on a left side end of the figure. The core energy balance display section 42 displays very small values of input and output energy flows and accumulated amount, i.e., inventory. The reactor vessel mass-balance display section 45 and the condenser mass-balance display section 46 show normal water levels.

When the vacuum up has been normally completed, the display color of the corresponding window changes to a green color.

Further, it is to be noted that the relationship between the window of this phase condition and the display color is equal to that in the following description of the other phases.

(2) Reactor Criticality

Figure 5:
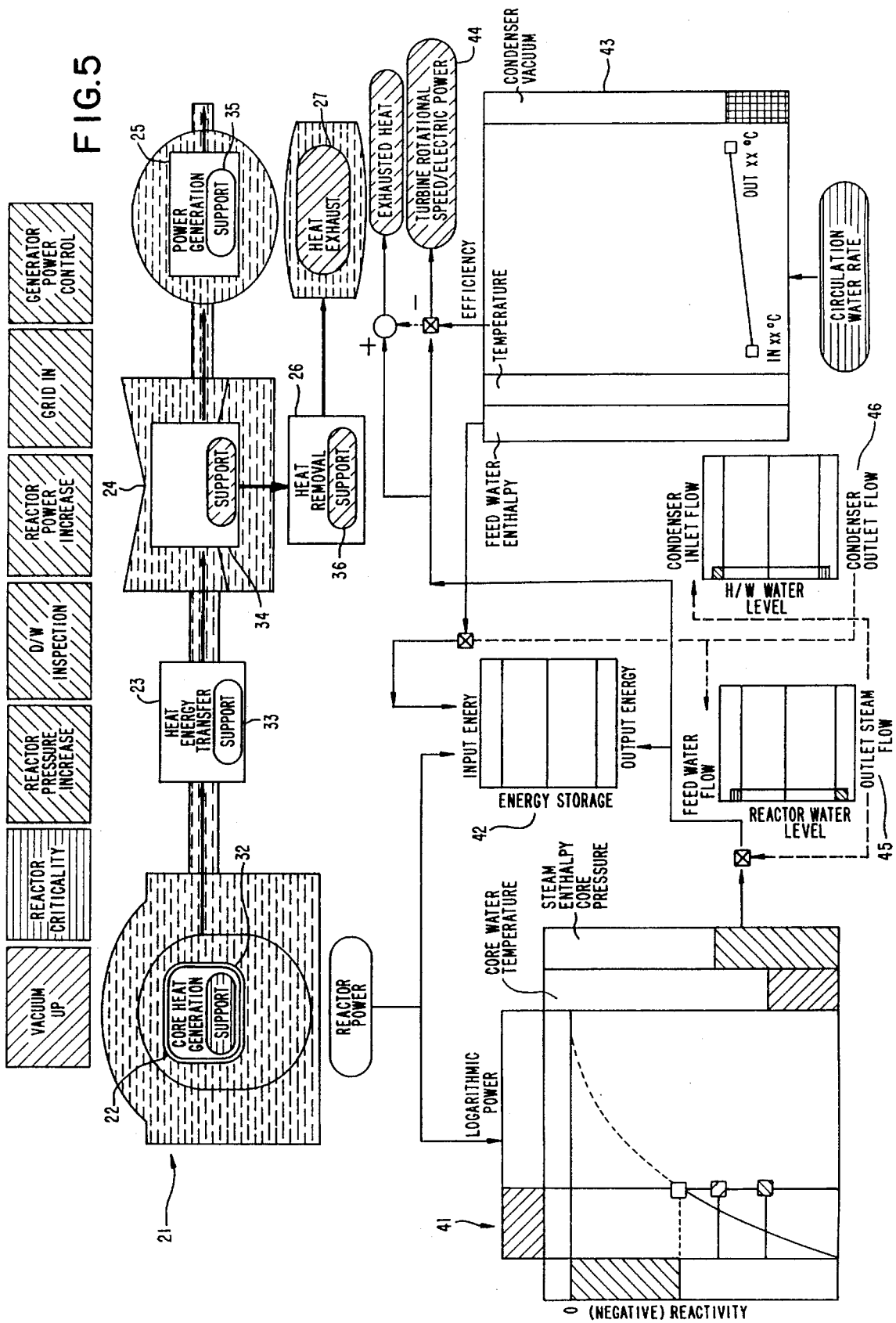
FIG. 5 is a diagram showing one display example at a reactor criticality phase of the display screen of FIG. 2.

In this phase, the control rods are withdrawn and core criticality is achieved. This process is shown in FIG. 5. As shown in FIG. 5, full monitoring at the phase plane of the logarithmic power/reactivity of the core main variable display section can be achieved. The other variables have substantially no change.

(3) Reactor Pressure Increase

Figure 6:
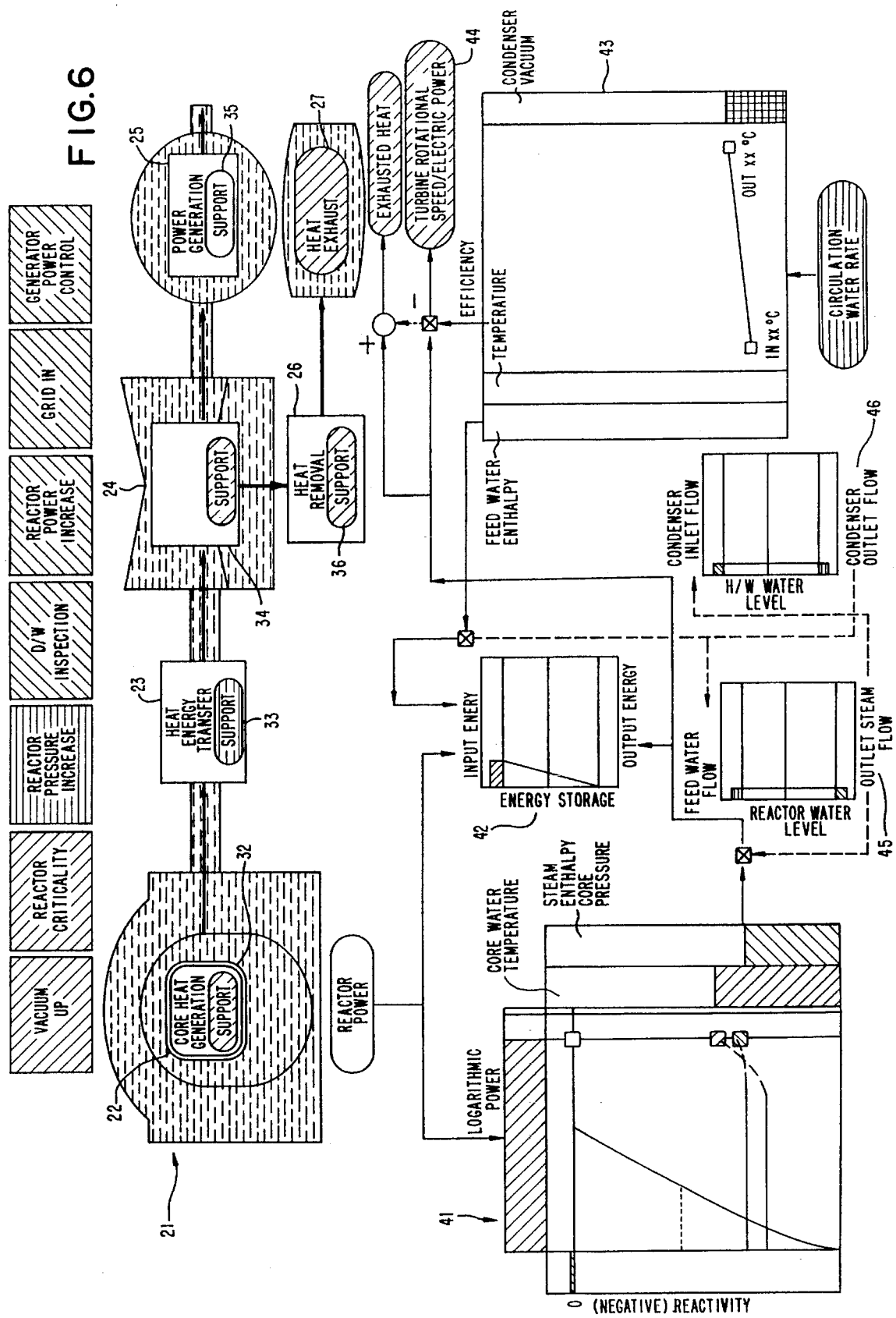
FIG. 6 is a diagram showing one display example at a reactor pressure increase phase of the display screen of FIG. 2.

In this phase, the reactor power is slightly increased, and the reactor vessel is heated by nuclear fission energy at a temperature-rise rate of 55° C./hr. According to this temperature rise, the reactor pressure is also increased. This process is displayed on the core main variable display section 41 and the core energy balance display section 42 as shown in FIG. 6.

(4) D/W Inspection

Figure 7:
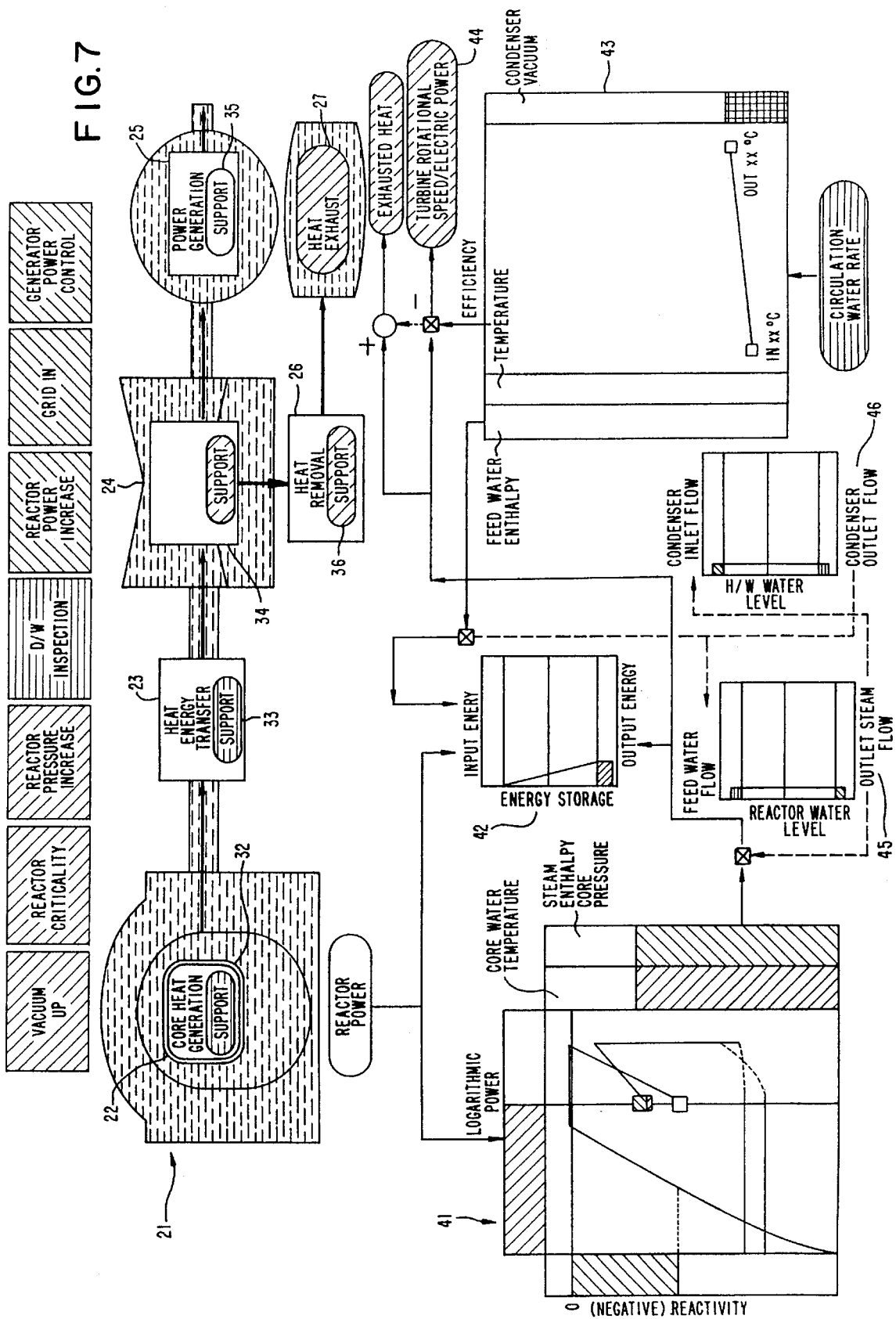
FIG. 7 is a diagram showing one display example at a D/W inspection phase of the display screen of FIG. 2.

After the reactor pressure has reached a rated value, the reactor is once returned to the subcritical state, and the operator enters a primary containment vessel (D/W) to examine whether or not any abnormality exists. In this process, as shown in FIG. 7, the logarithmic power is lowered according to the subcritical condition. Thus, the reactor water temperature and the reactor pressure are also lowered as shown in FIG. 7.

(5) Reactor Power Increase

Figure 8:
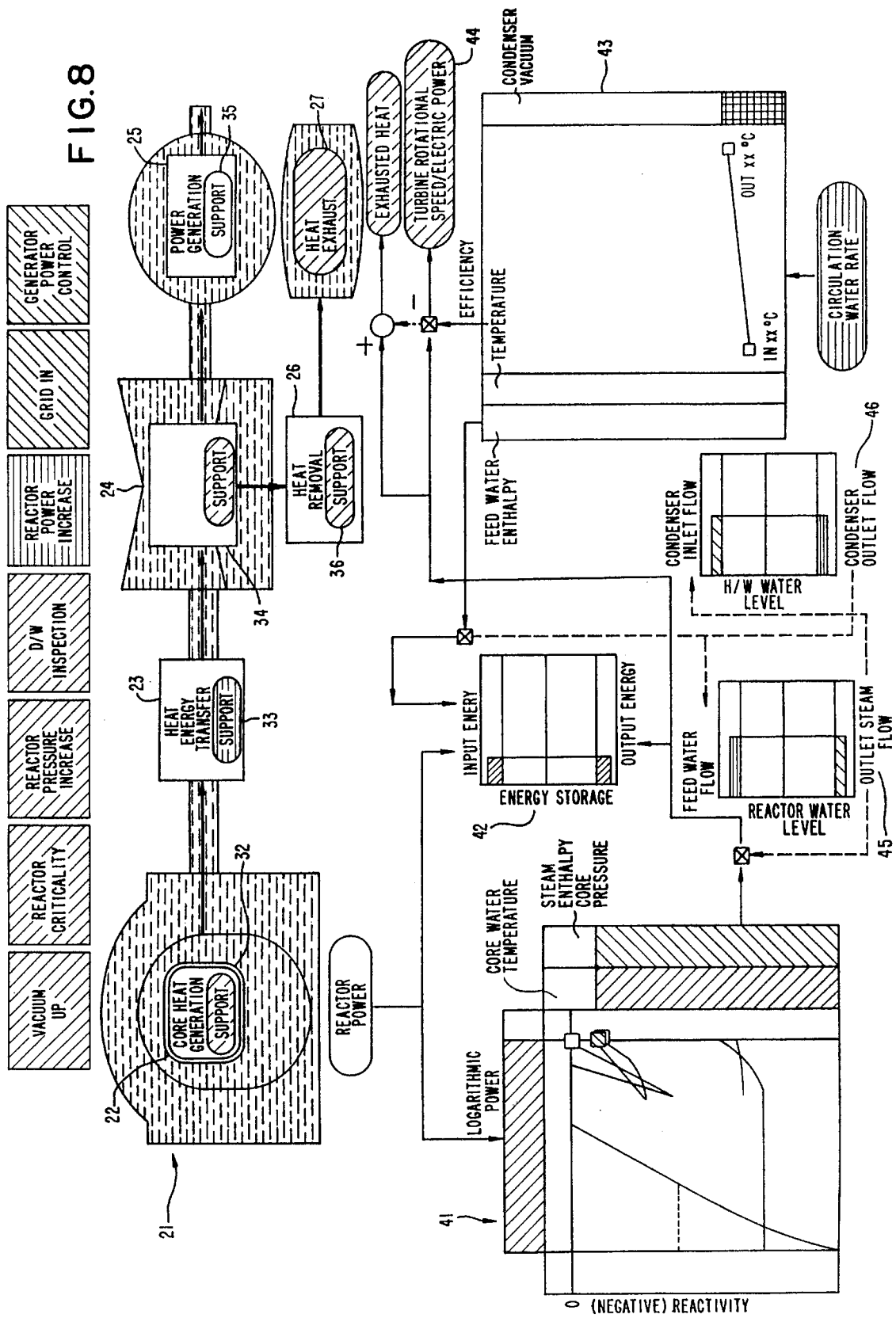
FIG. 8 is a diagram showing one display example at a reactor power increase phase of the display screen of FIG. 2.

The reactor is again returned to the critical state, and the logarithmic power is raised to recover and then maintain the reactor pressure at the rated value as shown in FIG. 8.

(6) Grid in

Figure 9:
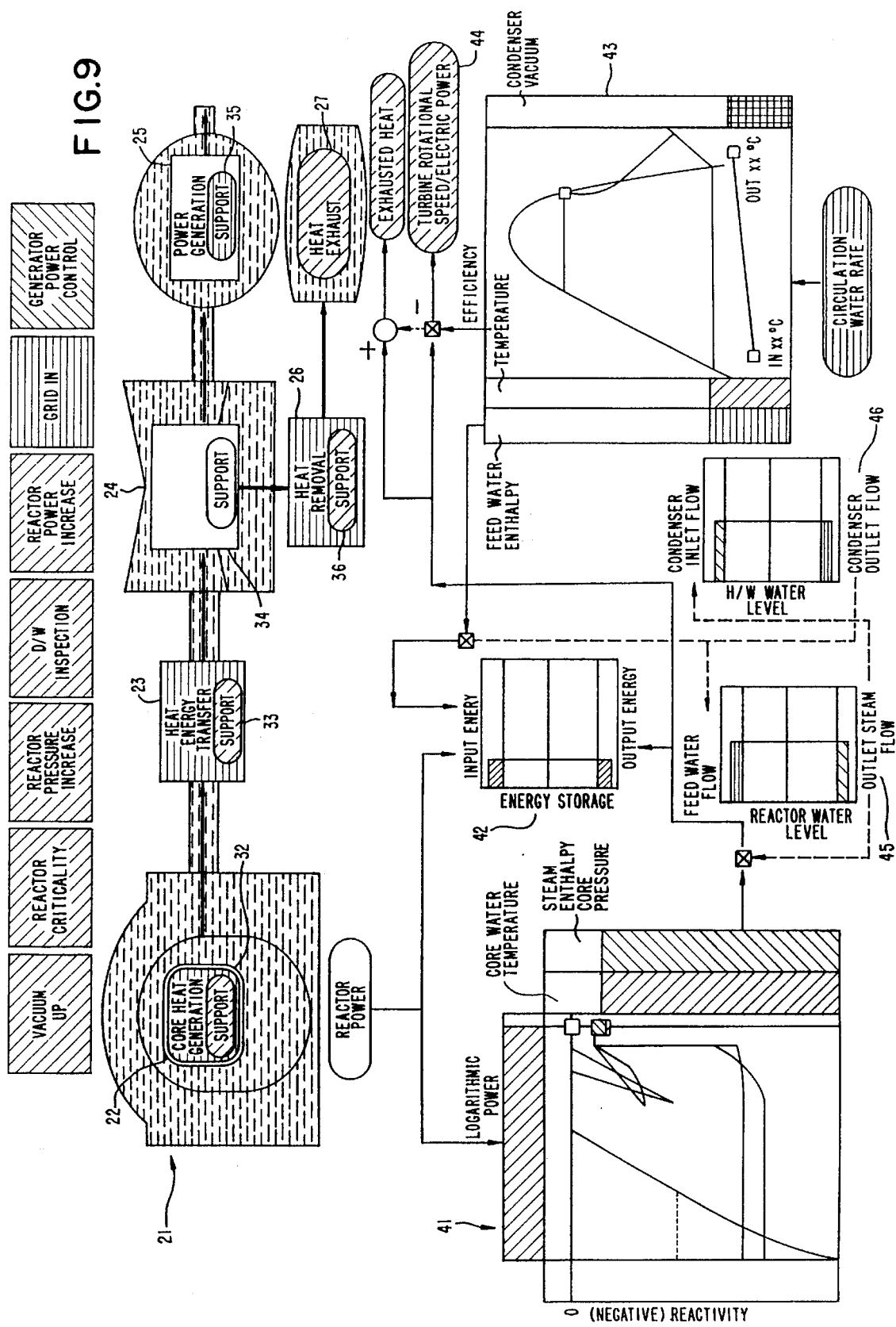
FIG. 9 is a diagram showing one display example at a grid in phase of the display screen of FIG. 2.

A turbine by-pass valve is gradually opened, and the reactor power is accordingly increased to thereby ensure a steam flow necessary for the turbine starting, that is, the increasing of the rotational speed thereof. In this process, the by-pass flow is first displayed on the turbine heat engine cycle display section 43 as shown in FIG. 9. After the turbine speed has reached the rated value, introduction of the generator into the system is carried out.

(7) Generator Power Control

Figure 10:
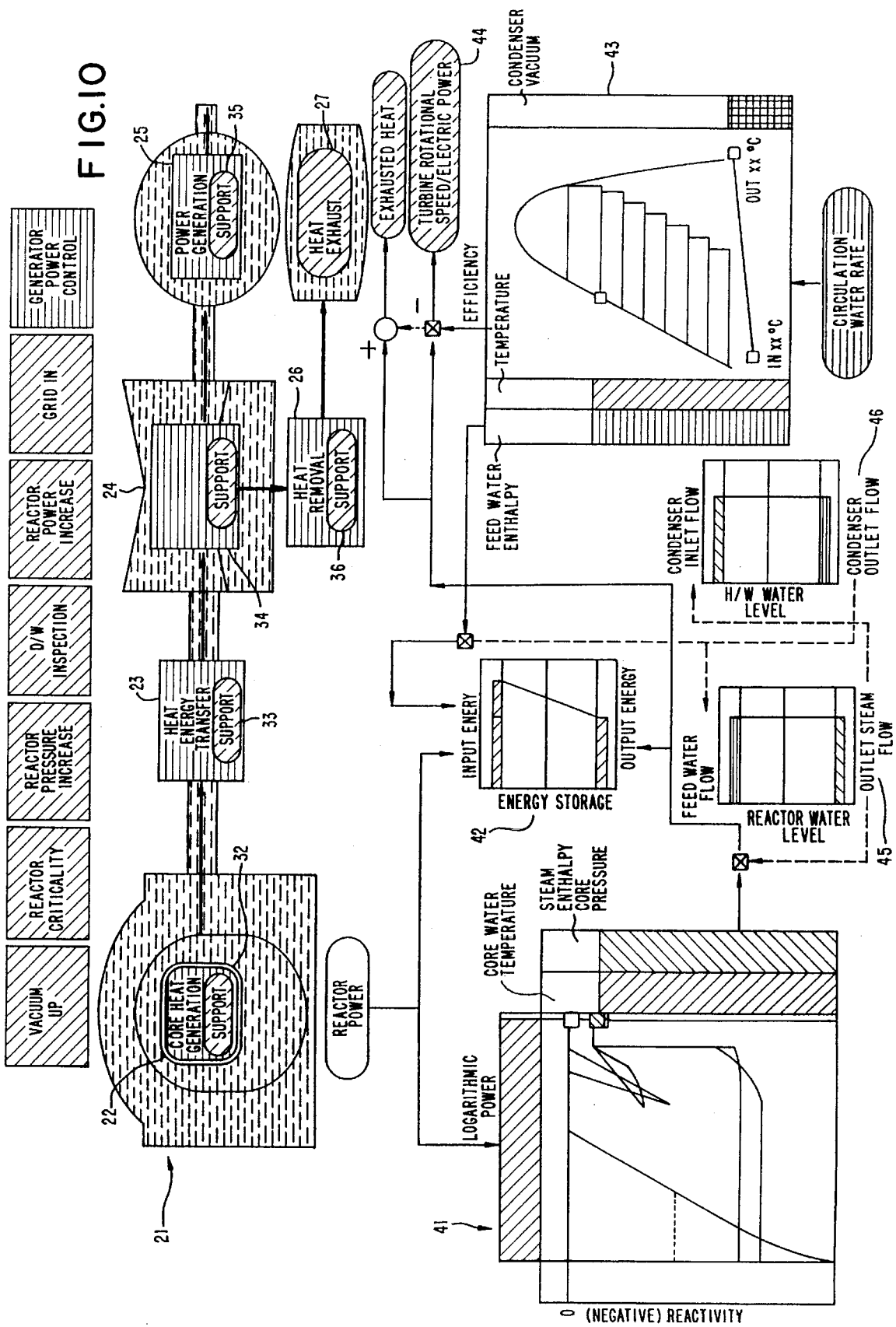
FIG. 10 is a diagram showing one display example at a generator power control phase of the display screen of FIG. 2.

The steam flow is transferred to the turbine by switching the degree of opening of the turbine by-pass valve and a governor valve, respectively, to thereby increase the generator load. After this switching operation, the reactor power is increased to increase the electricity production. In this phase, as shown in FIG. 10, "a display section showing a balance relationship between a core Rankine cycle portion, a re-circulation flow rate, and a sub-cooling temperature", disclosed in the Japanese Patent Application HEI-3-232698 of the same applicant as that of the subject application, may be substituted for the main variable display section with respect to the core. With respect to the turbine heat engine cycle display section 43, it is transferred to a display under steady state in accordance with advancing of the process of this phase.

According to the screen display method described above, the mass and energy conservation laws for the thermodynamic process of the plant can always be explicitly monitored, and the main process variables representing the respective phases can be easily grasped as patterns, so that the diagnosis of any abnormality and the countermeasure planning therefor can also be easily accomplished. That is, an application of direct perception capability of the operator is sought in accordance with a view showing an icon and its connection showing the mass and energy balance of the plant main portion and a view based on principle and law governing the characteristics of the plant main portion. Further, at the same time, knowledge based behavior of the operator is supported due to thought experiment based on these display symbols, that is, a mental model and its application of the operator in respect of the plant as the basis of the knowledge based behavior are supported so as to be properly performed.

Next, one example of a display screen or scope displaying, in representation, the main functions and conditions of their supports of total energy generation and conversion processes at the plant start up will be described hereunder.

This display example 21 is shown in a middle stage of FIG. 2, in which reactor heat generation 22 and the condition of a reactivity 32 as a main support of the heat generation are displayed subsequently, toward the right side end of the example 21, there are displayed a heat energy transfer function 23 and a condition of a main steam pressure as its support, a heat (steam)—mechanical (rotation) energy conversion 24 and a condition of vacuum of a condenser 34 as its support, a power generation function 25 and a condition of a turbine generator rotational speed 35 as its main support, a heat removal function 26 and a condition of a circulation water flow rate 36 as its main support, and a condition of an exhausted heat 27 as a final heat sink. These conditions are ordinarily displayed with separated colors, and in this example, the stop-inactive condition is displayed by a white color, the under preparation-phase transfer condition is displayed by a cyan color, and the normal or active or standby condition is displayed by a green color.

The phases in this example are explained hereunder, respectively.

(1) Condenser Vacuum Up

As shown in FIG. 4, the respective functions, except for the fact that the condenser vacuum 34 as the support of the heat-mechanical energy conversion 24 is under preparation and the circulation water flow quantity 36 as the support of the heat removal function 26 and the exhausted heat 27 are under working conditions, are under the stop-inactive conditions.

(2) Reactor Criticality

As shown in FIG. 5, the change from the condition of FIG. 4 is that the condenser vacuum assumes a normal state and the reactivity 32 is under preparation.

(3) Reactor Pressure Increase

As shown in FIG. 6, the change from the condition of FIG. 5 is that the reactivity assumes a normal state and the main steam pressure 33 is under preparation.

(4) D/W Inspection

As shown in FIG. 7, the main steam pressure once achieved is again lowered for the inspection, and as a result, the change from the condition of FIG. 6 is that the reactivity 32 is again returned to the preparation condition.

(5) Reactor Power Increase

As shown in FIG. 8, the reactivity 32 and the main steam pressure 33 are here recovered, and since the reactivity 32 is first recovered, substantially the same state as that of FIG. 6 is established at this moment.

(6) Grid in

As shown in FIG. 9, the goal in,this phase is to increase the rotational speed of the turbine generator 35 to the rated value to thereby introduce the generator into the electric power grid, which becomes the preparation condition as shown in FIG. 9. At the same time, since, in advance of the turbine starting, the by-pass steam is caused to flow, the core heat generation 22, the heat energy transfer 23 and the heat removal 26 become the preparation conditions.

(7) Generator Power Control

As shown in FIG. 10, in this phase, the rotational speed of the turbine generator 35 is increased to the rated value. Since the plant is in the process of power rise toward the target electricity power as the goal of the plant start up, the support functions have all assumed normal states, and the main function are displayed as "under condition transfer".

The above displays may be utilized together with the displays of the windows showing the respective phases.

According to the screen display method described above, the main functions and the conditions of these main supports at the plant starting time can always be explicitly monitored, and these conditions representing the characteristic features of the respective phases can be easily grasped as patterns.

Furthermore, since the relationships between these respective functions and between the respective functions and the supports can be clearly displayed, the diagnosis of any abnormality and carrying out of the countermeasure planning therefor can be easily accomplished.

With reference to the example of FIG. 2, there are described hereunder data and calculation equations necessary for representing and displaying, at the plant start up at which the achieving of the energy generation and conversion processes is desired for the power plant, the flow of substance and energy, the balance condition thereof, and the principle and law with respect to the steam cycle of the operating fluid.

(A) Energy Flow/Energy Balance in Plant (a) Core Main Process Variable Display Section (i) With respect to the logarithmic power, a logarithmic value of the reactor power is utilized as one of the plant signals.

(ii) With respect to the reactivity, it is obtained from a trend record of the reactor power.

(iii) With respect to the core water temperature and the reactor pressure, measured values are utilized as plant process signals. Saturated steam enthalpy is obtained from the reactor pressure by utilizing a steam table.

(b) Core Energy Balance Display Section (i) Outlet energy flow Main steam flow rate×Saturated steam enthalpy (ii) Inlet energy flow Reactor power+Feed water flow rate×Feed water enthalpy+Recirculation pump motor power (iii) Energy inventory (accumulated amount) is as follows.

Figure 11:
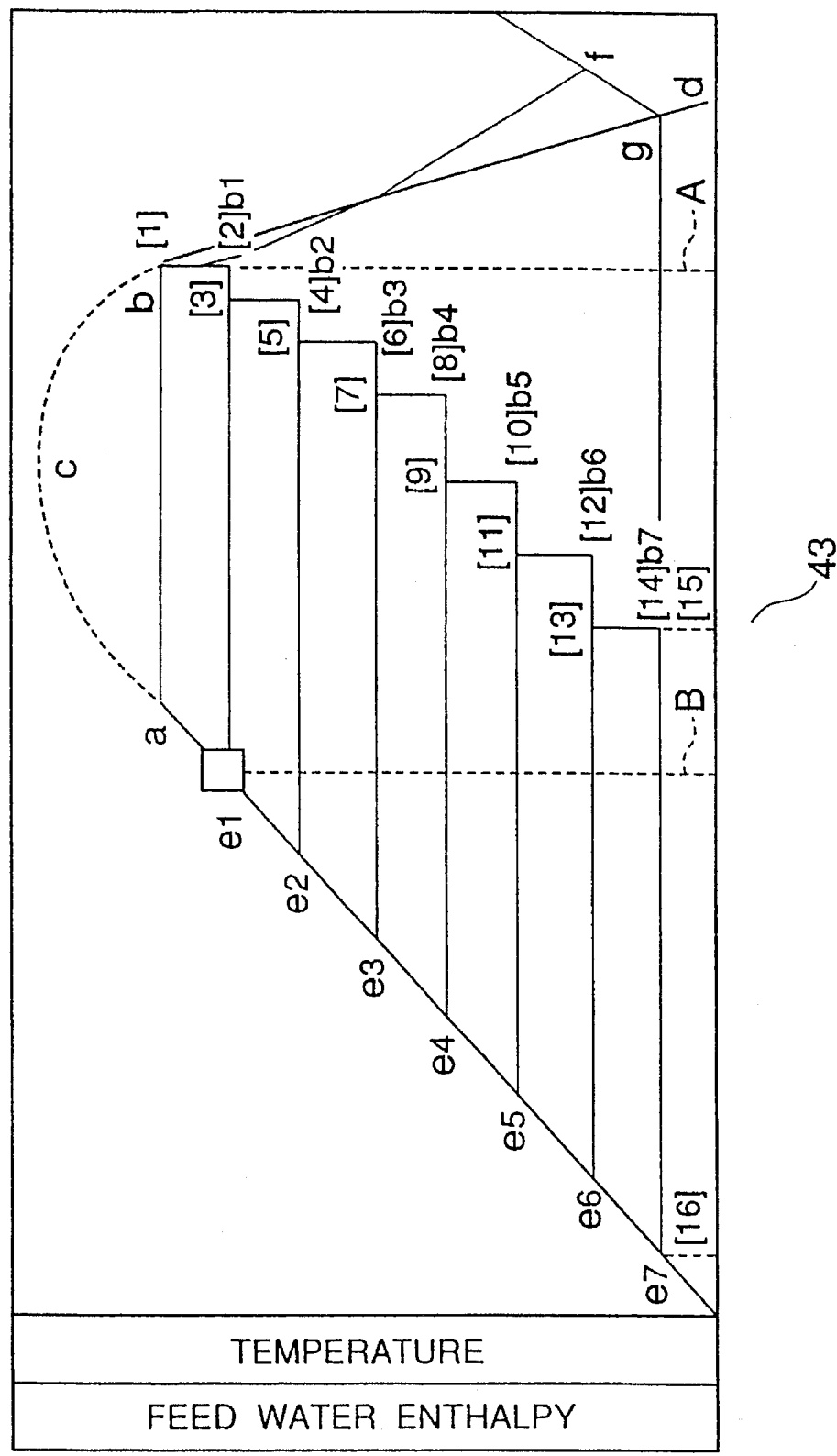
FIG. 11 is a graph indicating a turbine heat engine cycle of FIG. 2 on an enlarged scale.

Energy Inventory ∫ (inlet energy flow−outlet energy flow)dt (c) Figure of Turbine Heat Engine Cycle FIG. 11 is a view of a turbine heat engine cycle on an enlarged scale. With reference to FIGS. 2 and 11, pump work in connection with the water feed is neglected. A display method relating to this display is as follows.

(i) Saturated water line (c-a-e7), Saturated steam line (c-b-d): theoretical value theoretically calculated from the steam tables as a fixed display.

The following measured value and calculated values are utilized for displaying the entropy values of the figure of the turbine heat engine cycle.

(ii) b2 entropy value

The following equation is established, wherein M1 denotes the main steam flow rate and mH2 denotes a high pressure first stage extracted steam flow rate.

$(M1-mH2)/M1$=line section ([3]-$e1$)/line section ([2]-$e1$).

From this equation, [3](b2) point is obtained. Here, the equation M2=(M1−mH2) is given.

(iii) b3 entropy value

The following equation is established, wherein mH3 denotes a high pressure second-stage extracted steam flow rate.

$(M2-mH3)/M2$=line section ([5]-$e2$)/line section ([4]-$e2$).

From this equation, [5](b3) point is obtained. Here, the equation M3=(M2−mH3) is given.

(iv) b4 enthalpy value

The following equation is established, wherein mH4 denotes a low pressure first-stage extracted steam flow rate.

$(M3-mH4)/M3$=line section ([7]-$e3$)/line section ([6]-$e3$).

From this equation, [7](b4) point is obtained. Here, the equation M4=(M3−mH4) is given.

(v) b5 entropy value

The following equation is established, wherein mH5 denotes a low pressure second-stage extracted steam flow rate.

$(M4-mH5)/M4$=line section ([9]-$e4$)/line section ([8]-$e4$).

From this equation, [9](b5) point is obtained. Here, the equation M5=(M4−mH5) is given.

(vi) b6 entropy value

The following equation is established, wherein mH6 denotes a low pressure third-stage extracted steam flow rate.

$(M5-mH6)/M5$=line section ([11]-$e5$)/line section ([10]-$e5$).

From this equation, [11](b6) point is obtained. Here, the equation M6=(m5−mH6) is given.

(vii) b7 entropy value

The following equation is established, wherein mH7 denotes a low pressure fourth-stage extracted steam flow rate.

$(M6-mH7)/M6$=line section ([13]-$e6$)/line section ([12]-$e6$).

From this equation, [13](b7) point is obtained. Here, the equation M7=(M6−mH7) is given.

Figure 12:
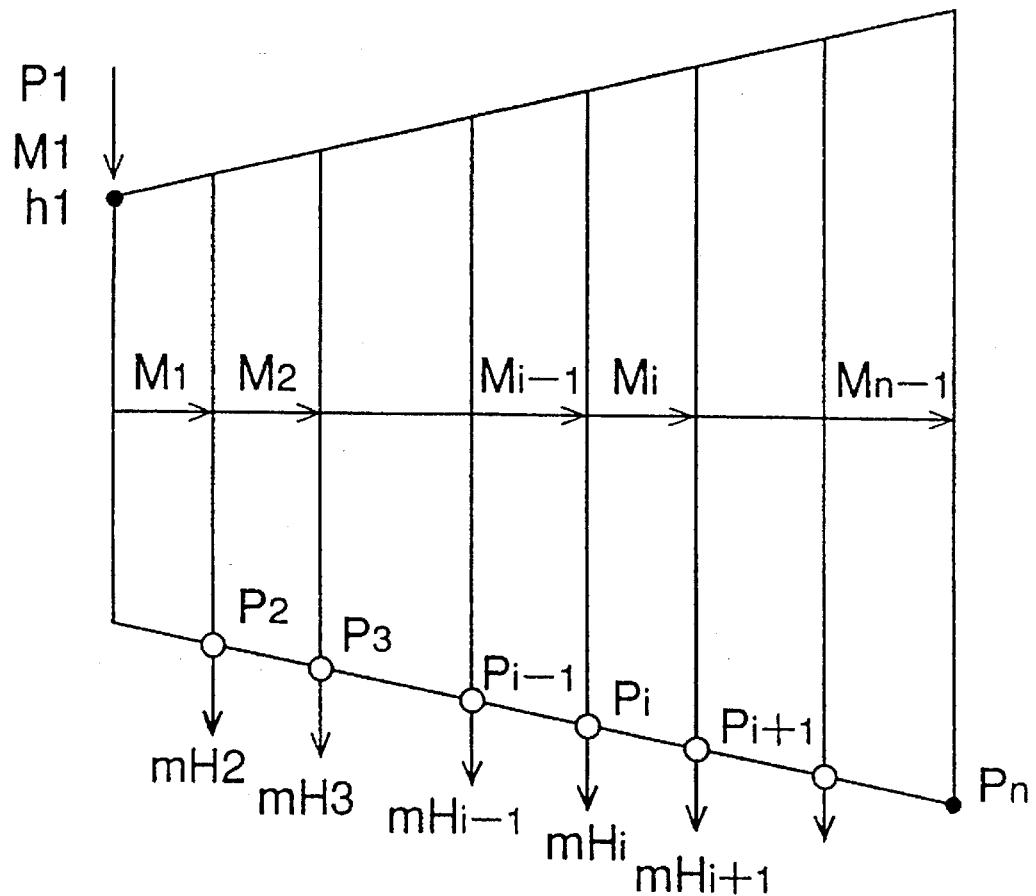
FIG. 12 is a diagram indicating the relationship between turbine steam extraction pressure, steam flow rate and steam extracted flow rate for obtaining a turbine steam extraction pressure.

Further, the turbine extracted steam flow is calculated from relationships among the pressures of the respective stages, steam flow rates and extracted steam flow rates as shown in FIG. 12. The extracted steam pressure is obtained from the stodola equation shown below on an upstream side with the assumption of a value Pn of the final stage (pressure of condenser) being applied as the extracted steam pressure.

$$Pi=\{CiMi^2(Ti+273.15)+P^2i+1\}^{1/2}(i=n-1\sim 1)$$

Ci is a constant which is preliminarily set in connection with the rated point. Ti represents a steam temperature which is obtained by the pressure Pi of the saturated steam from the steam table, wherein Ti=F(Pi).

The turbine steam flow rate is obtained from the following relationship from the upstream side as already shown.

$$M2 = M1 - mH2 \qquad (1)$$
$$M3 = M2 - mH3$$
$$\cdot$$
$$\cdot$$
$$\cdot$$
$$Mi+1 = Mi - mHi+1 \; (1)$$

The steam of the final stage is all condensed by the condenser, and the turbine extracted steam pressure (steam extracted for a feed water heater) is determined in accordance with the turbine pressure. Further, the extracted steam and the pressure of the corresponding stage are as follows.

$$mHi=CHi \times Pi(i=2 \sim n-1) \qquad (2)$$

In this equation, CHi is a constant which is set on the basis of the value at the rated point, and Ci and CHi constants are calculated from the following equations by using P1, M1, P2, mH2, ... Pi, mHi, ... at the rated points.

$$Mi=Mi+1+mHi$$

$$Ci=(Pi^2-Pi+1^2)/Mi^2(Ti+273.15)$$

$$CHi=mHi/Pi \qquad (3)$$

{Pi} {Ti} sequences are sequentially calculated from the above equations (1), (2) and (3) and the steam tables through the following repetition steps and the extracted steam flow rate is then calculated.

Step 1: {Pi} is calculated by the equation (1). At this time, as an estimate of {Ti}, a steam temperature corresponding to an estimate of {Pi} is used from the steam tables.

Step 2: Temperatures {Ti} of the respective stages are calculated by the pressures {Pi} of the respective stages from the steam tables.

The step 2 is repeated until the {Ti} sequence is converged. The estimates of the extracted steam flow rates from the respective stages of the turbine are calculated from the finally obtained pressures {Pi} of the respective stages and the equation (3).

The feed water temperature at the outlet of the feed water heater is shown as e1~e6 in FIG. 11, and its calculation, i.e., measurement, method is shown hereunder.

(viii) Temperature: e7

The condenser steam temperature or the condensate temperature is utilized for the temperature: e7.

(ix) Temperature: e1

The temperature at the feed water side outlet of the first-stage feed water heater is utilized for feed water enthalpy/temperature display e1 after passing the first-stage feed water heater.

(x) Temperature: e2

The temperature at the feed water side outlet of the second-stage feed water heater is utilized for feed water enthalpy/temperature display e2 after passing the second stage feed water heater.

(xi) Temperature: e3

The temperature at the feed water side outlet of the third-stage feed water heater is utilized for feed water enthalpy/temperature display e3 after passing the third stage feed water heater.

(xii) Temperature: e4

The temperature at the feed water side outlet of the fourth-stage feed water heater is utilized for feed water enthalpy/temperature display e4 after passing the fourth-stage feed water heater.

(xiii) Temperature: e5

The temperature at the feed water side outlet of the fifth-stage feed water heater is utilized for feed water enthalpy/temperature display e5 after passing the fifth-stage feed water heater.

(xiv) Temperature: e6

The temperature at the feed water side outlet of the sixth-stage feed water heater is utilized for feed water enthalpy/temperature display e6 after passing the sixth-stage feed water heater.

(xv) Turbine efficiency η

It is assumed that the points A B, [15] and [16] in FIG. 11 are on the absolute temperature 0° K.

$$\eta = (\text{area}(e1\text{-}a\text{-}b\text{-}A\text{-}B) - \text{area}(e7\text{-}b7\text{-}[15]\text{-}[16]))/\text{area}(e1\text{-}a\text{-}b\text{-}A\text{-}B)$$

(xvi) Circulating water system inlet water temperature/ Circulating water system outlet water temperature This is to be displayed by connecting, with a straight line, the measured values of the circulating water inlet temperature/circulating water outlet temperature so that the difference between these temperatures can be perceived.

(xvii) By-pass steam flow

The by-pass steam is expanded from the point b as an isoenthalpic expansion and then cooled and condensed by the circulating water. This process is displayed by an isoenthalpic line bf and an isobaric line gf in the superheated steam area corresponding to the condenser vacuum, both lines bf and gf being obtained from the steam tables.

(xviii) Condenser vacuum

This is displayed by utilizing measured values.

(d) Energy Sink

Electric power/exhaust heat is obtained from the following equations and then displayed.

Electric power=(reactor thermal power×efficiency η or actually measured value)

Exhaust heat=(reactor thermal power×(1−η) or actually measured value)

Further, before the connection to power grid, the turbine rotational speed is displayed in place of the electric power.

(B) Mass (water) Balance and Flow Rate (a) Reactor Vessel Mass Balance (i) Inlet water flow rate (actually measured value)

This is the sum of the coolant flow rate for the control rod drive mechanism and the inlet water flow rate from the clean up water system in addition to the feed water flow rate at the plant starting time.

(ii) outlet water flow rate (actually measured value)

This is the sum of the outlet water flow rate for the clean up water system in addition to the main steam flow at the plant starting time.

(iii) Reactor water level

This is displayed by using the measured value.

(b) Core Recirculation Water Flow Rate

This is displayed by using the measured value.

(c) Condenser Mass Balance (i) Inlet mass flow rate

This is the measured value of the sum of the turbine inlet flow rate, steam drier drain flow rate, by-pass flow rate and make-up water flow rate.

(ii) Outlet mass flow rate

This is displayed by using the measured value.

(iii) Condenser water level

This is displayed by using the measured value.

(d) Condenser Circulation Water Flow Rate

This is displayed by using the measured value.

As described above, according to the embodiment of the present invention, it becomes possible to display information suitable for problem solving by a human, i.e. the operator, to prevent erroneous judgement of the operator and hence to prevent trouble not desired for the operation of the plant.

Figure 13:
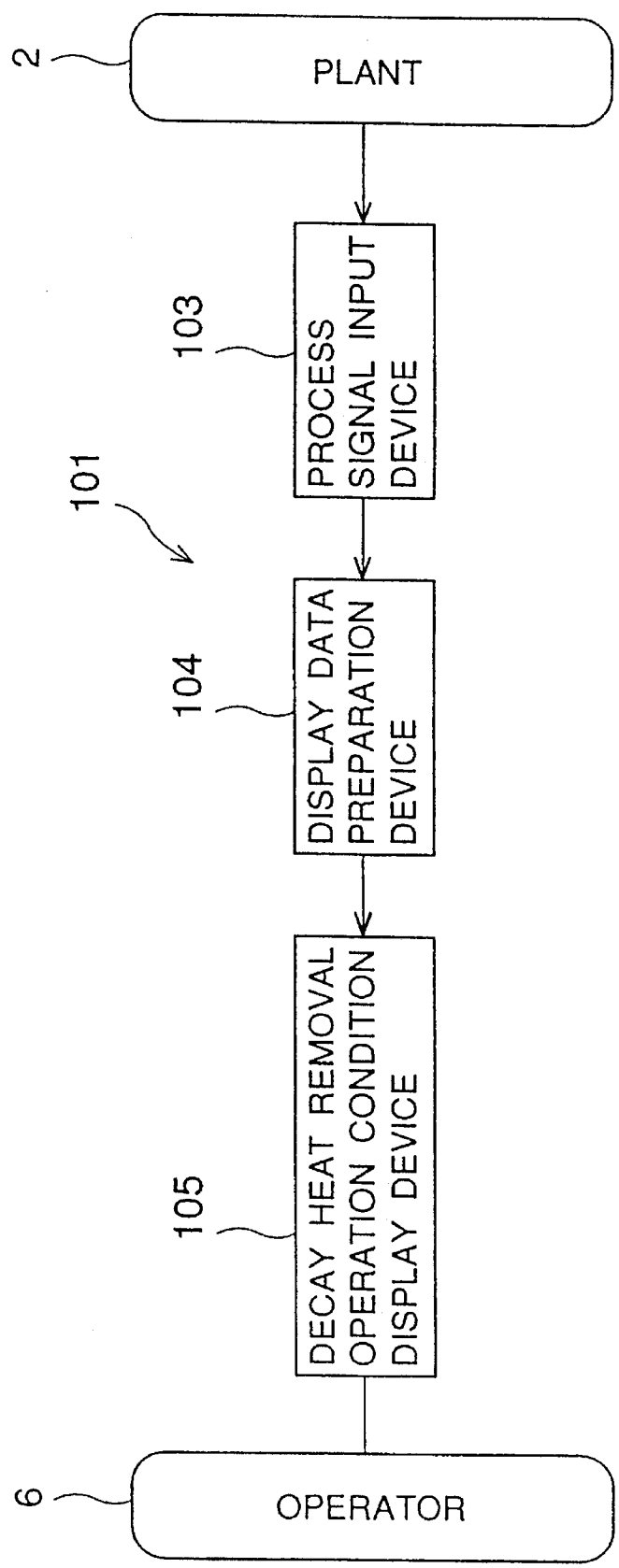
FIG. 13 is a block diagram representing the composition of a plant condition display system according to a second embodiment of the present invention.

FIG. 13 is a block diagram representing a plant condition display system as a second embodiment of the present invention. The plant condition display system 101 of this embodiment represents a decay heat removal operation condition display system. This plant condition display system 101 comprises a process signal input device 103 into which process signals are inputted from the plant 2 to be operated, a display data preparing device 104 for preparing a display data of the plant condition in response to process signals from the process signal input device 103, and a decay heat removal operation condition display device 105 for preparing a display screen in response to the display data prepared by the data from the display data preparing device 104 and displaying the same. The operator 6 can thereby accurately and definitely judge the plant condition without error upon referring to the display screen for confirmation.

A screen display method in accordance with the decay heat removal operation condition display device 105 will be described hereunder.

Figure 14:
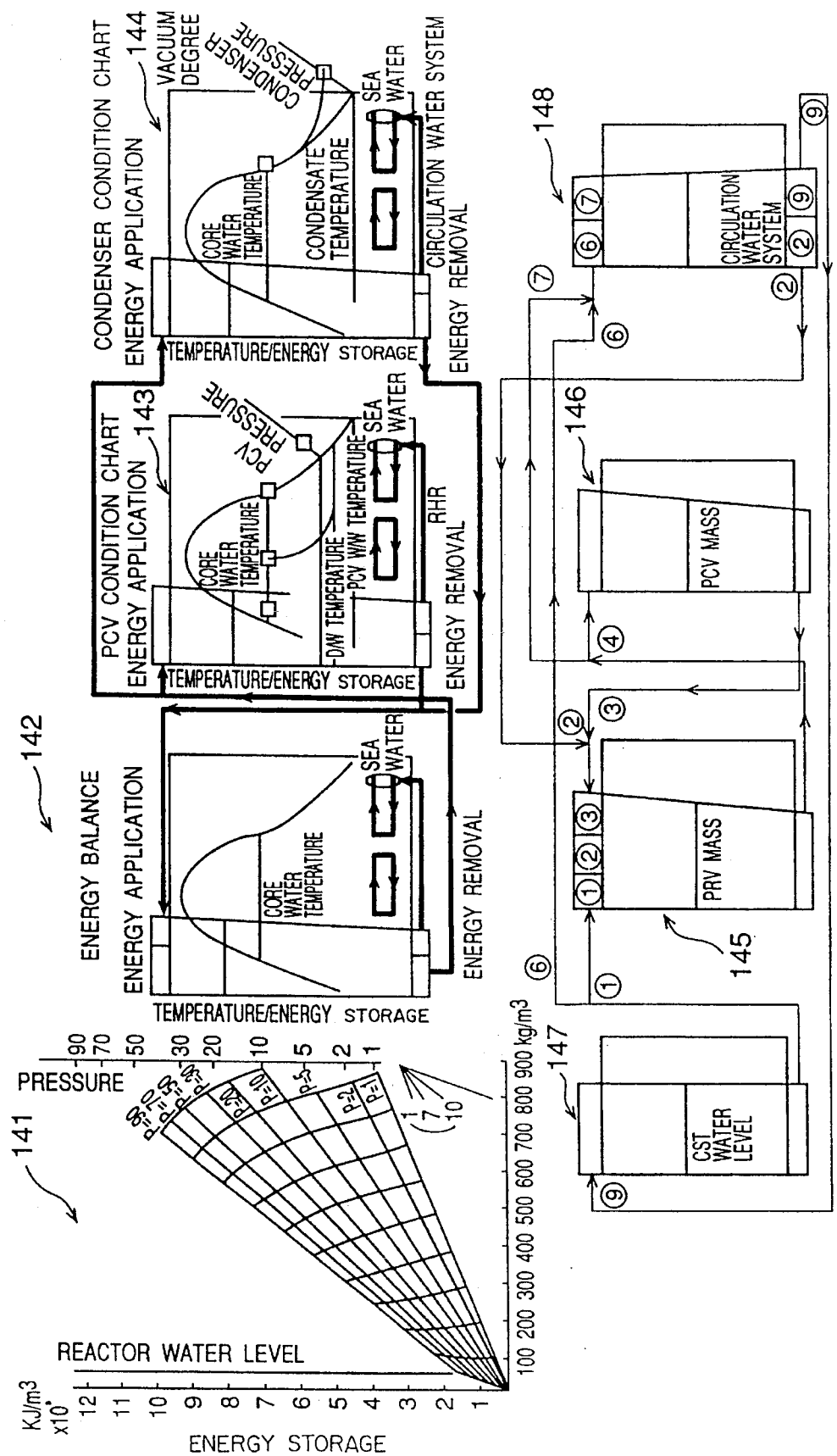
FIG. 14 is a diagram of one example of a display screen in the system of FIG. 13.

FIG. 14 shows an example of screen display adapting a display method for directly displaying the process information of the plant by using the principle and theory of mass and energy flow as a basic process of the power plant and the balance condition thereof and an operating fluid with respect to thermohydrodynamic behavior.

This display screen displays the cause and result in the plant structure-function level due to abstract information of high abstraction level to thereby expect direct confirmation of the change in plant performance and the control condition.

On the upper half of the display screen, a portion showing the energy flow and the energy balance in the plant is provided and, on the lower half thereof, a portion showing water-steam flow and the mass balance in the entire plant for realizing this energy flow is disposed.

The upper portion showing the energy flow and the energy balance is composed of a display section 141 for displaying the main process variables in the reactor vessel, an energy balance display section 142 showing the balance between input energy and output energy of the reactor vessel, a display section 143 displaying thermohydrodynamic behavior and energy balance in the reactor containment vessel and a display section 144 displaying thermohydrodynamic behavior and energy balance in the turbine main condenser, and the upper portion displays the mutual relationships among these display sections. That is, in FIG. 14, a thick line denotes energy flow and a thin line denotes water or steam flow.

The lower portion of the display screen shows the mass flow and its balance and is composed of a reactor vessel mass balance display section 145, a reactor vessel mass balance display section 146, a pure water storage tank mass balance display section 147 and a condenser mass balance display section 148.

The manner in which the plant operation condition is displayed at the decay heat removal operation period will now be described in conjunction with FIG. 14.

Figure 15:
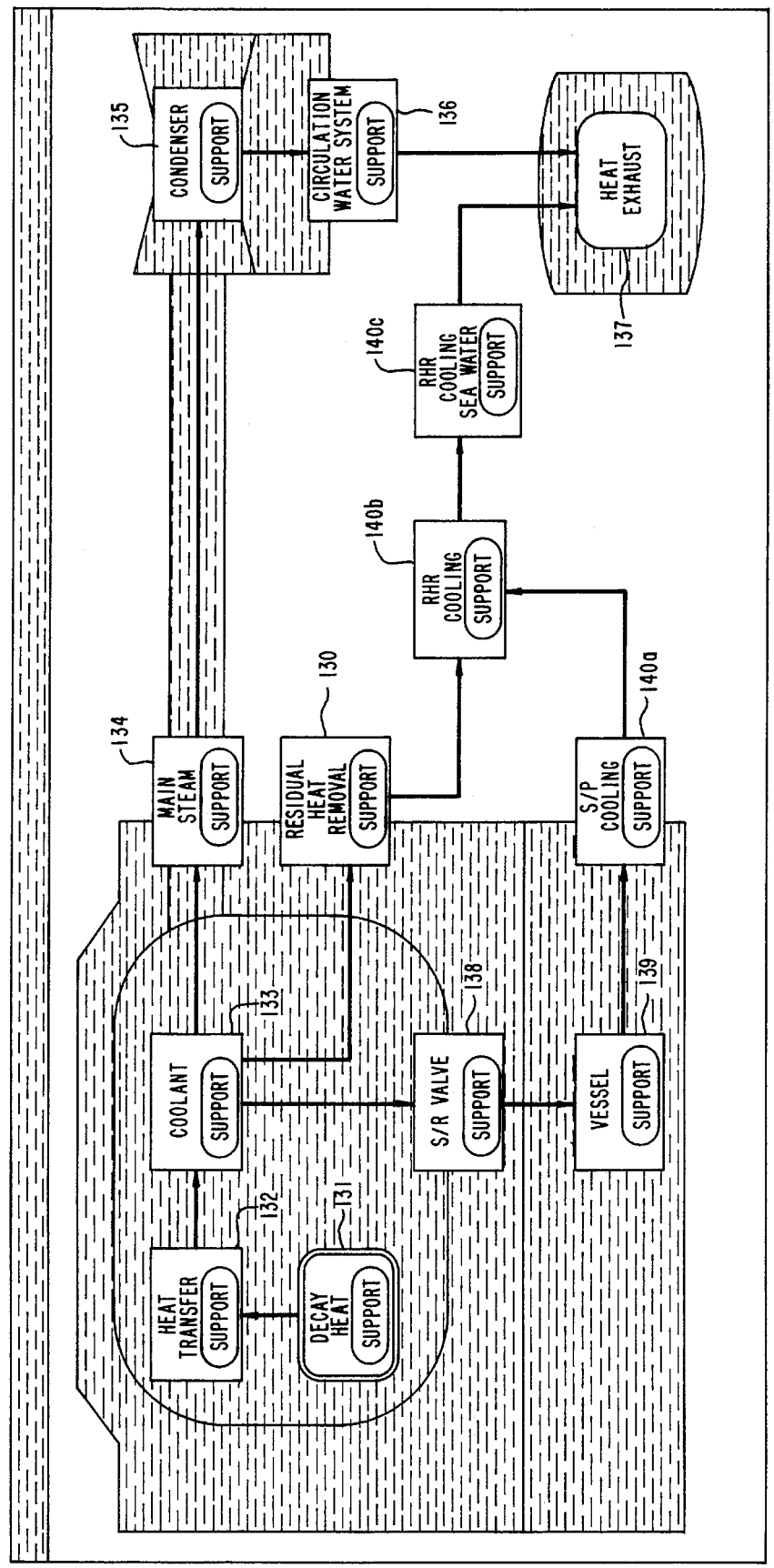
FIG. 15 is a diagram showing the energy flow at a decay heat removal operation mode in a plant.

FIG. 15 shows the energy flow at the decay heat removal operation period in the plant, that is, the thermal transfer process for safely removing, to the final heat sink, the decay heat due to the fusion product in the core after an ordinary shut down or an emergency shutdown, together with its support function.

With reference to FIG. 15, the decay heat 131 generated in the core portion is transferred to the coolant 133 in the reactor vessel by the heat transfer 132 due to the coolant in the core. The heat transfer path from the reactor vessel includes three routes as shown. In the case where an ordinary system is usable, the heat is transferred to a condenser 135 through a main steam line 134 and a turbine by-pass valve. The heat is then transferred to a final heat sink through a circulation water system 136 and disposed of as exhaust heat 137. On the other hand, in the case where the primary containment vessel is isolated for preventing radiation from leaking, the heat in the reactor vessel is transferred into the containment vessel 159 through an safety release valve 140. Thereafter, the heat is transferred to the final heat sink through safety release valves 140a, 140b and 140c and disposed of as exhaust heat 137. In the above two routes, the heat is transferred by means of the steam flow, but in the case where the cooling of the decay heat is sufficiently achieved and the pressure in the reactor vessel is then lowered, the heat in the vessel is transferred to the final heat sink, to carry out direct cooling of the interior of the vessel, through a residual heat removal 130 and then disposed of.

With reference to FIG. 14, the energy balance is rapidly attenuated after the reactor shutdown, but since it is important to ensure a heat removal capability in proportion to a large amount of the decay heat, items of information relating to this matter are provided as shown on the energy balance display section 142. For the reason described above, in FIG. 14, the difference between the input heat (decay heat and enthalpy of cooling water supplied to the reactor vessel) and the heat removal (output heat: heat energy due to reactor vessel outlet water flow steam and the residual heat removal 130 of FIG. 15) is represented by a line showing an inclined angle, and the energy inventory in the reactor vessel is also represented. Here, the energy inventory, together with the coolant water in the reactor vessel, is an important condition variable for determine the reactor vessel pressure. Further, when the residual heat removal 130 of FIG. 15 is achieved, since the heat removal is directly performed from the reactor vessel by this system, this fact is displayed on this display section, which will be described in detail hereinlater.

Further with reference to FIG. 14, the reactor vessel main process variables display section 141 is composed of a phase display showing the relationships described above. With the assumption that the interior of the reactor vessel is maintained in a uniform and constant water-steam saturated condition, this display section shows the conversion from (energy inventory vs coolant quantity) to (reactor pressure vs reactor water level). The main function of this figure can be said that it enables an operator to judge an abnormality at a time of signal verification and existence oil significant difference and to predict lowering of the water level at a time of pressure reduction.

In general, in the case where a cold shutdown is unavoidable, it is desirable to transfer the core water supplying means to a lower pressure stage. However, at a time of high pressure, in the case where any abnormality occurs in the high pressure core water supplying means, a problem arises as to when the pressure reduction is to be carried out, and a problem of the need to study in relation to lowering of the water level in accordance with the pressure reduction.

Figure 16:
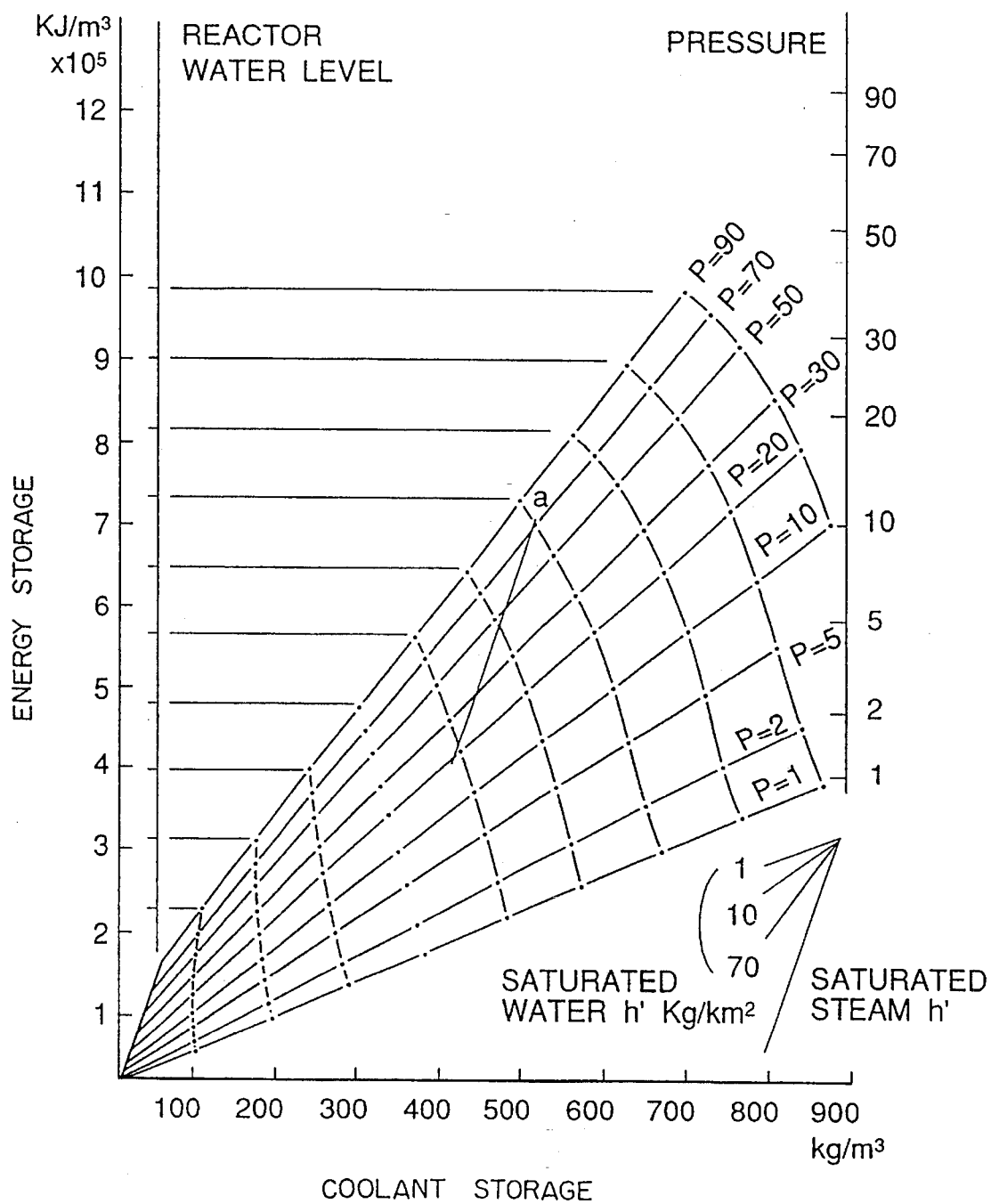
FIG. 16 is a graph of a display section of a reactor vessel main process variables on an enlarged scale.

FIG. 16 is an enlarged view of the display section 141. With reference to FIG. 16, it is assumed that the present condition is represented by the point a and the safety release valve is released at this point to release saturated steam x(Kg). The energy reduction y(kJ) in accordance with this reduction is then expressed as follows.

$$y = h'' \times x$$

(h" represents the enthalpy (KJ/Kg) of the saturated steam). By showing of the symbol h" as that shown at the right lower portion of the graph of FIG. 16, the relationship x-y in accordance with the pressure reduction is easily determined as a line, and the value of the amount of water level lowering after the pressure reduction can be approximately determined by reading that line on the pressure-water level coordinate.

Next, in the reactor containment vessel display section 143, a condition display utilizing a temperature-entropy (Ts) chart regarding the energy balance and the steam in the reactor containment vessel is performed. The temperature scale on the axis of ordinate of the Ts chart displays the reactor pressure vessel core water temperature, drywell and wetwell temperatures in the primary containment vessel and the primary containment vessel cooling system temperature. The chart also displays the condition change of the steam flow from the reactor vessel. The out-flow through the safety release valve is displayed as an isoenthalpic flow of the saturated steam by an isoenthalpic line on the Ts chart as shown. This is displayed, as a kind of icon, in the case of the out-flow from the safety release valve and the display is stopped when the out-flow steps. Further, when a leakage from a primary pressure boundary connected to the reactor vessel is detected, its out-flow condition is displayed as isoenthalpic flow from the starting point in accordance with whether the flow condition is the steam phase, liquid phase or both, FIG. 14 showing the case of both phases.

The inlet energy flow in the reactor containment vessel corresponds to the leakage through the safety release valve and the primary pressure boundary, and the outlet energy flow corresponds to a quantity to be removed by the primary containment vessel cooling system. These energy flow rate are displayed with the energy inventory and its changing rate similarly as in the case of the reactor vessel as shown in FIG. 14.

In FIG. 14, the condenser state display section 144 displays the state in the condenser with the use of a Ts chart relating to energy balance and steam.

With reference to FIG. 14, the inlet energy flow is based on the by-pass steam flow into the condenser through the turbine by-pass valve. The by-pass steam is subjected to isoenthalpic expansion and condensed by the circulation water while being reduced in its temperature by a spray water. This process is displayed on the T-S diagram, in which the condensate temperature, the condenser vacuum and the corresponding isobaric lines are displayed.

On the other hand, the outlet energy flow is an energy amount to be removed by the circulation water system, and to show this heat transfer process, the coolant temperature distribution of the circulation water system is displayed.

The above inlet and outlet energy flows are both displayed, in their energy balances, in exactly the same manner as in the cases of the reactor vessel and the primary containment vessel with respect to the energy inventory of the condenser and its changing rate.

With respect to the residual heat removal 130 of FIG. 15, the heat removal is carried out directly from the reactor vessel, so that its operating condition is displayed on the reactor vessel energy balance display section 142. That is, the coolant temperature distribution of the residual heat removal system is displayed by using the temperature scale of the ordinate commonly set with respect to the primary containment vessel display section 143 and the condenser display section 144, and the energy removed by this system is displayed as a portion of the removed energy in the reactor vessel energy balance display.

The water-steam flow and the mass balance thereof shown at the lower portion of FIG. 14 will be described hereunder.

The inlet water flow rate in the reactor vessel 145 is the sum of the flow rate from the condenser to the feed water system (including control rod drive mechanism coolant system) and the flow rate from the reactor containment vessel or pure water storage tank due to an emergency core cooling system. The outlet water flow rate is the sum of the outlet steam flow rates of the leakage from the safety release valve and the primary pressure boundary to the primary containment vessel or from the turbine by-pass flow (including RCIC turbine exhaust flow) to the condenser. The water-steam inventory (coolant storage) in the reactor vessel due to these flow rates and their changing rates are displayed. The coolant quantity is, as already described, converted into the reactor pressure and the water level, together with the reactor vessel energy inventory, in the reactor vessel main process variables display section 141, which is utilized for the comparison with the actually measured value.

The inlet water flow rate in the reactor vessel 146 is the sum of the flow rate from the reactor vessel through the safety release valve and the leakage (including RCIC turbine exhausted steam) from the primary pressure boundary. The out-flow rate is the flow rate to the reactor vessel due to the emergency core cooling system (including RCIC). The coolant mass storage in the primary containment vessel and its changing rate are displayed by the display method (metaphor) similar to that performed for the reactor vessel.

The inlet water flow rate in the condenser 148 is the sum of the turbine by-pass flow rate and the make-up water from the pure water storage tank. The coolant inventory in the condenser and its changing rate by this flow rate are displayed by a common display method (metaphor).

In the pure water storage thank, the inlet water flow rate is not considered and the outlet water flow rate is the sum of the flow rate to the reactor vessel due to the emergency core cooling system and the make-up water to the condenser. The water storage and its changing rate are displayed by a common display method(metaphor).

According to the screen display method described above, the energy flow and the energy balance condition in the whole plant at the decay heat removal operation mode can be easily grasped. At the same time, since the main condition variable representing the heat transfer characteristics of the respective heat energy transfer paths during the operation can also be easily grasped as patterns, the diagnosis of the abnormalities and the countermeasure action planning for the abnormalities can be easily accomplished. The coolant flow rates and their inventories in the respective sections of the plant for realizing these energy transfers can also be totally displayed by the common display method, thereby enabling the operator to easily grasp the whole plant operating condition. The operator can thus easily make his decision in accordance with the given information enabling him to forecast the reactor pressure and the water level as the important variables for the core cooling.

With reference to the unified metaphor based display method showing the mass and energy balance of the main portions of the plant, the figures showing the connection therebetween and the figures showing the characteristics of the main portions on the basis of the principle and law, the activation of the direct perception of the operator is sought. At the same time, the knowledge based behavior of the operator due to the thinking experiment based on the display symbol can be assisted. Above all, it is important to assist the appropriate usage of the operator mental model for a plant and its activation.

Hereunder, there is described at example for, in abstract, displaying the heat transfer processes at the decay heat removal operation at the plant shutdown mode and the conditions of their support functions. As will be described hereunder, these processes and their support conditions are always calculated by computers from process data and judged as to whether they are normal or abnormal, which are, for example, expressed in color as follows.

TABLE 1

|  | Normal | Abnormal |
| --- | --- | --- |
| Operating Condition | Green | Yellow |
| Standby Condition | White | Brown |
| Shutdown Condition |  | Black |

The respective processes and their supports of FIG. 15 will be described hereunder With respect to the decay heat 131, it is judged as to whether the generated heat amount coincides with a standard value within an allowance for error, which is mainly determined by elapsed time after the reactor shutdown. Its support is the subcriticality in the core and judged from the position of the control rod or the like. With respect to the heat transfer 132, the heat transfer from the core fuel to the core coolant water is evaluated, but, if it is within the decay heat, it is sufficiently small as the heat transfer amount, so that if the core coolant flow rate as the support for the heat transfer 132 or the core water level ensuring sufficient heat transfer surface is normal, the heat transfer 132 can be said to be normal.

The coolant 133 is judged by the energy inventory in the reactor vessel, but it is practical to judge it from the reactor pressure in accordance with the relation shown in FIG. 16. As this support, the coolant inventory in the reactor vessel, practically, the reactor water level, is utilized. The main steam 134 is evaluated by its heat transfer rate, but its standard value is determined to be the generated heat energy standardized by the rated value in the case where only this system is utilized for the heat removal, and its support is the main steam flow rate. The standard value thereof is a value obtained by dividing that heat transfer rate by the steam enthalpy. The condenser 135 is considered to be a buffer or storage of the energy flow in an ordinary heat removal system, which is evaluated by the energy inventory. In practice, the condenser vacuum is utilized. As its support, off-gas system necessary for the maintenance of the vacuum and the turbine ground steam system are considered and the support is evaluated by their performance values.

The water circulation system 136 is evaluated by its heat transfer rate, and its standard value is determined in accordance with the consideration similar to that taken with respect to the main steam 134. Its support is the circulation water flow rate. The safety release valve 138 is evaluated from its heat transfer rate, and its standard value is determined by the number of valves to be opened and the steam condition. Its support is also decided by the number of the valves to be opened and the steam condition similar to that made with respect to the safety release valve 138. The reactor containment vessel 139 is evaluated from its energy inventory, and in practical use, is evaluated from the reactor vessel pressure and the water temperature of the pool in the reactor vessel. Its support is the pool water level. The primary containment vessel coolings 140a, 140b and 140c are evaluated from their heat transfer rate, and their standards are determined by the performance of the cooling system activated and the thermodynamic condition of the cooled system 139. Their support is the coolant flow rate. The residual heat removal 130 is also evaluated from the heat transfer rate similar to that made with respect to the primary containment vessel 140a, 140b and 140c, and its support is the coolant flow rate.

According to the screen display method as described above, in the decay heat removal operation mode at the plant shutdown period, the energy flows and their support conditions can always be monitored explicitly. The diagnosis of an abnormality and its countermeasure planning, and in particular, the preparation of a substitution system can be smoothly made by making clear the relationship between the various processes and between the processes and their supports.

Data and/or calculation equations for displaying, in representation, the material flow and energy flow and their conditions of balance during the decay heat removal operation at the plant shutdown mode of the embodiment on the screen display of FIG. 14 and the principle and law governing the operating fluid with respect to the thermohydrodynamic behavior will be described hereunder.

Figure 17:
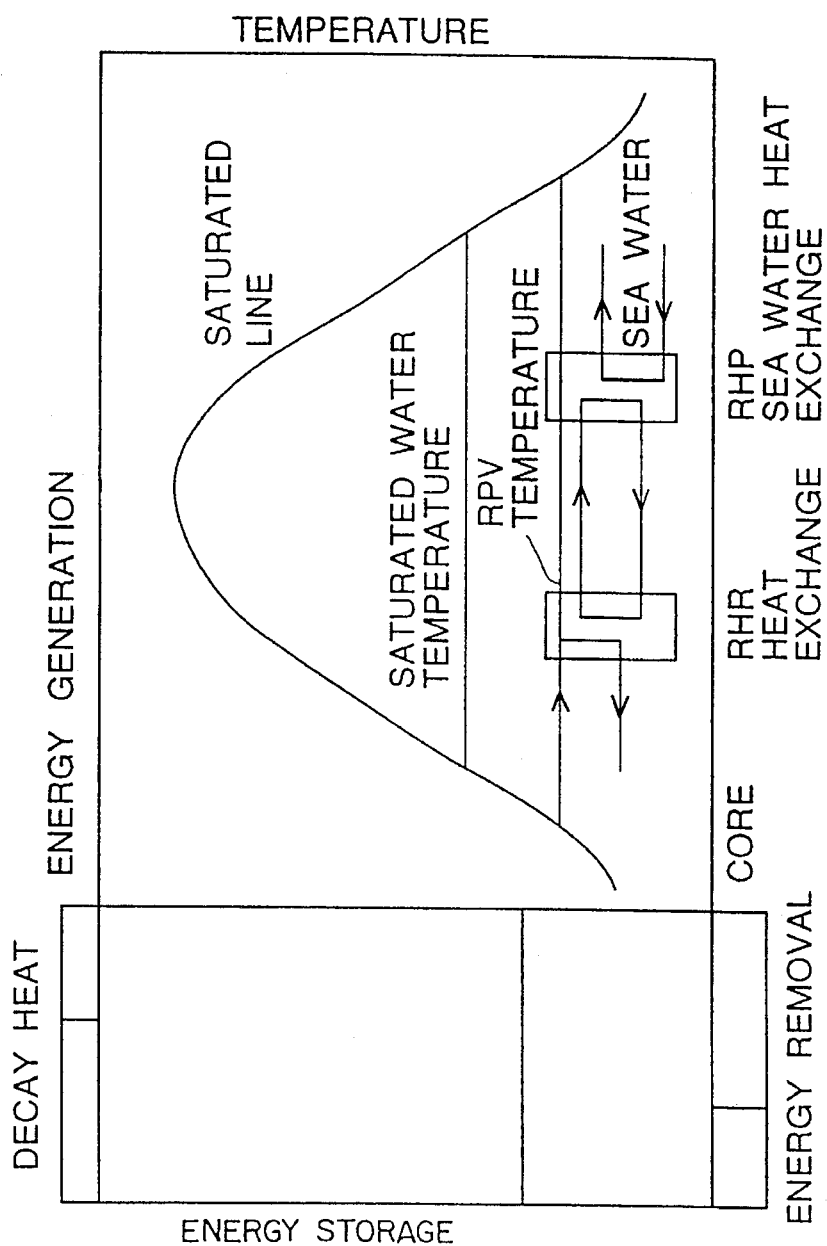
FIG. 17 is a graph of a reactor vessel energy balance display section on an enlarged scale.

(A) Energy Flow-Energy Balance in Plant
(a) Reactor Vessel Energy Balance Display Section
FIG. 17 shows this display section on an enlarged scale.

(i) Outlet energy flow=by-pass steam flow rate×saturated steam enthalpy

+safety release valve steam flow rate×saturated steam enthalpy

+leakage flow rate from primary pressure boundary×outflow fluid enthalpy

+residual heat removal system removed heat amount

Further, the saturated steam enthalpy is obtained from the steam tables in view of the reactor pressure.

The out-flow enthalpy is obtained from the steam tables if, in case of wet steam, its quality can be determined.

The residual heat removal system removed heat amount is obtained from the measured value of the flow rate in this system and the measured value of the temperature difference between the high and low temperature sides.

(ii) Inlet energy flow=decay heat+in-flow fluid rate×in-flow fluid enthalpy

The decay heat is calculated on the basis of, for example, ANS standard ANS 5.1.

The in-flow fluid enthalpy is obtained from measured values of temperatures of the respective in-flows shown in the following (B) (a) (i) section.

(iii) Energy inventory is as follows.

$$\text{Energy inventory} = \int (\text{inlet energy flow} - \text{outlet energy flow}) dt$$

(iv) Saturation line: theoretical value being calculated from the steam tables and displayed stationarily (v) Temperature of reactor water in the reactor vessel
Measured values are utilized.

(vi) Temperature of saturated water in the reactor vessel
This is calculated from the measured values of the pressure in the reactor vessel by using the steam tables.

(vii) Residual heat removal system
The measured values of the temperatures of the high and low temperature side fluids in the system are shown.

The high temperature side fluid temperature is the reactor water temperature. This display may show the operating condition by being displayed only at the operating time by this system.

(b) Reactor Vessel Main Process Variable Display Section
(i) Reactor vessel energy inventory
The values of the above item (a) (iii) are used.
(ii) Coolant amount in reactor vessel
Values of the following item (B) (a) (iii) are used.
(iii) Reactor water level and reactor pressure
Measured values as plant process signals are used.
(iv) Estimations of reactor water level and reactor pressure In an assumption of the uniform steady saturated condition, the following equations are established, in which capital H denotes the reactor vessel energy inventory and capital M denotes the coolant amount in the reactor vessel.

$$V = M\{v'(p)(1-x) + v''(p)x\}$$

$$H = M\{h'(p)(1-x) + h''(p)x\}$$

$$L = Mv'(p)(1-x)/V$$

V: volume of reactor vessel; L: generalized water level; x: saturated steam quality; v: specific volume; h: enthalpy (h': saturated water; h'': saturated steam)

In the above equations, FIG. 16 is obtained by applying the following ranges to the pressure p and the water level L and applying these ranges to the values M and H.

$$1at \leq p \leq 90at, \quad 0 \leq L \leq 1.$$

The generalized water level L cab be converted to the existing water level from an inner structure (height vs cross section) of an existing reactor vessel.

(c) Reactor Containment Vessel Display Section

Figure 18:
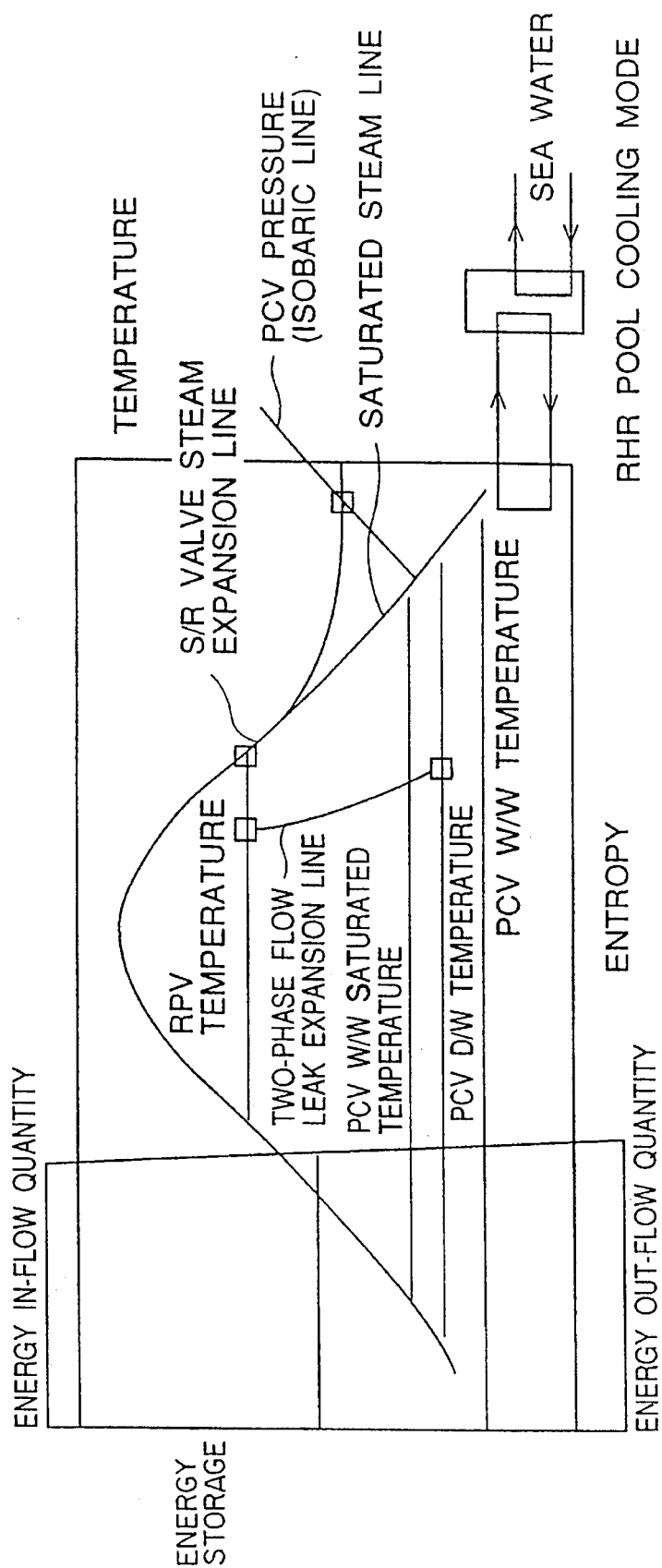
FIG. 18 is a graph of a primary containment vessel display section on an enlarged scale.

FIG. 18 shows an enlarged view of the reactor containment vessel display section. The necessary data and calculation equations will be described hereunder on the basis of this display section.

(i) Saturation line

This is a theoretical value which is calculated from the steam tables and displayed stationarily.

(ii) Temperature of reactor water in reactor vessel

Measured values are utilized.

(iii) Out-flow from safety release valve

As described hereinbefore, this is displayed in icon as the isoenthalpy out-flow of the dry saturated steam. The out-flow is for the wetwell (W/W), so that the W/W isobaric line is displayed in the superheated steam area, and the display is stopped at its point of intersection. The saturated temperature of the W/W is displayed as an extension of the isobaric line. The isoenthalpic line and the isobaric line are obtained from the steam tables, and measured values are utilized for the W/W pressure.

(vi) Temperature of W/W water

This is obtained from measured values.

(v) Reactor containment vessel system

Measured temperature values of the high and low temperature side fluids in the cooling system are displayed. It is also possible to carry out this display only at the operating time of this system to display the operating condition.

(vi) Leakage from primary pressure boundary

This is displayed in icon as the isoenthalpy outflow from one point on the reactor vessel saturated temperature line. The steam flows towards the W/W through the drywell (D/W), but the display is stopped on the D/W temperature line. The isoenthalpic line is obtained from the steam tables.

(vii) D/W temperature

Measured values are utilized.

(viii) In-flow energy flow=safety release valve flow rate× saturated steam enthalpy +leakage flow rate from primary pressure boundary×outflow fluid enthalpy (ix) Out-flow energy flow=emergency core cooling system flow rate×W/W water enthalpy +reactor containment vessel cooling system removed heat quantity Further, the first items are obtained, respectively, and the second items are obtained from the cooling system flow rate and the difference in temperatures between the high and low temperature sides.

(x) Energy inventory is expressed as follows.

$$\text{Energy inventory} = \int (\text{inlet energy flow} - \text{outlet energy flow})dt$$

(xi) Temperature of saturated water in reactor vessel

This is calculated from the measured values of the reactor vessel pressure.

(d) Condenser Display Section

Figure 19:
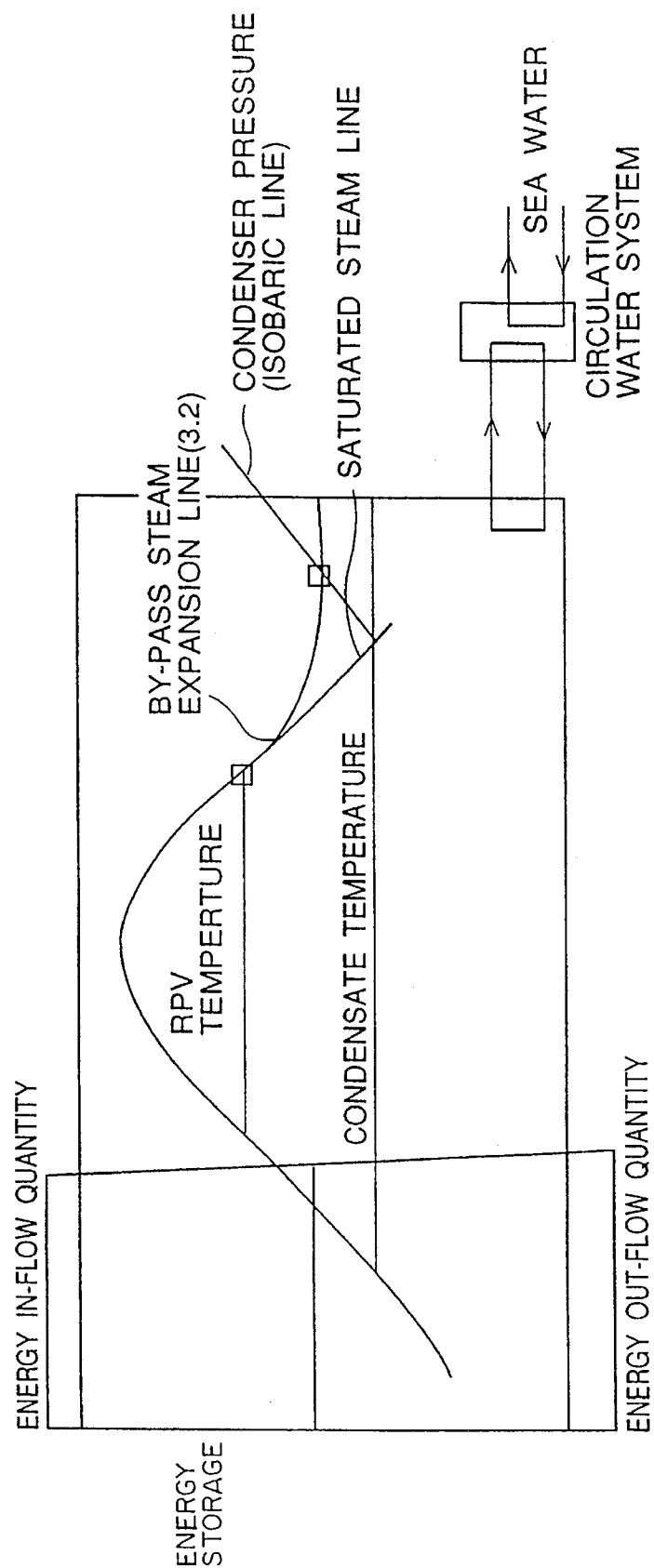
FIG. 19 is a graph of a condenser display section on an enlarged scale.

An enlarged view of this display section is shown in FIG. 19.

(i) Saturated line

This is a theoretical value which is calculated from the steam tables and then displayed stationarily.

(ii) Temperature of reactor water in reactor vessel

Measured values are utilized.

(iii) By-pass steam flow

As described hereinbefore, this is displayed in icon as the isoenthalpy out-flow of the dry saturated steam. The out-flow is for the condenser, so that the isobaric line is displayed in the overheated steam area with respect to the condensate temperature, and the display is stopped at its point of intersection. The isoenthalpic line and the isobaric line are obtained from the steam tables.

(iv) Temperature of condensate

Measured values are utilized.

(v) Circulation water system

Measured values are utilized for both the inlet and outlet temperatures.

(vi) Inlet energy flow=by-pass steam flow rate×saturated steam enthalpy.

(v) Outlet energy flow=circulation water flow rate×enthalpy difference at portions between circulation water inlet and outlet.

Further, the respective right side items are obtained from measured values.

(vi) Energy inventory is as follows.

$$\text{Energy inventory} = \int (\text{inlet energy flow} - \text{outlet energy flow})dt$$

(vii) Temperature of saturated water in reactor vessel.

This is calculated from the measured value of the reactor vessel pressure.

(B) Water Mass-Balance and Flow rate,in Whole Plan (a) Reactor Vessel Mass-Balance (i) Inlet flow rate (actually measured value)

This is the sum of the feed water flow rate, the cooling water flow rate for the control rod drive mechanism, and the in-flow rate of the core cooling systems for emergency (including RCIC).

(ii) Outlet flow rate

* By-pass steam flow rate (including the RCIC turbine flow quantity), measured value.

* Safety release valve flow rate=number of valves opened×calculated flow rate of each valve.

* Leakage flow rate from primary pressure boundary= estimation.

(iii) Coolant quantity in reactor vessel is expressed as follows.

$$\text{Coolant mass storage in reactor vessel} = \int (\text{inlet water flow rate} - \text{outlet water flow rate})dt$$

(b) Primary Containment Vessel Mass-balance (i) Inlet water flow rate

* Safety release valve flow rate=number of valves opened×calculated flow rate of each valve.

* Leakage flow rate from primary pressure boundary= estimation.

* RCIC exhaust condensing rate=RCIC turbine flow rate (estimated value).

(ii) outlet water flow rate

The flow rates of the emergency core cooling systems (including RCIC), measured value.

(iii) Mass storage in reactor containment vessel is expressed as follows.

$$\text{Mass storage in primary containment vessel} = \int (\text{inlet water flow rate} - \text{outlet water flow rate})dt$$

(c) Condenser Mass-Balance (i) Inlet flow rate measured value of the sum of the by-pass flow rate and make-up water flow rate from the pure water storage tank.

(ii) Outlet flow rate

Feed water flow rate: measured value.

(iii) Water mass storage in condenser is expressed as follows, and the measured value of the water level is also displayed.

Water mass storage in condenser=∫ (inlet water flow rate−outlet water-flow rate)$dy$ (d) Pure Water Storage Tank Mass-Balance
 (i) Outlet water flow rate: measured value.
 (ii) Stored water quantity in the pure water storage tank is expressed as follows and the measured value of the water level in the tank is also displayed.

Water mass storage in pure water storage tank=initial stored water quantity−∫ (outlet water flow rate)$dt$ Data and calculation equations required for displaying, in abstract, the heat transfer processes and the conditions of their support function is during the decay heat removal operation period at the plant shutdown time of the embodiment shown on the display of FIG. 15 are described hereunder.

(1) Decay Heat
The standard value of the decay heat was referred to herein on (A) (a) (ii) with reference to the embodiment of FIG. 14. With respect to the core subcriticality of the support of the delay heat, the full loading of the full control rods is judged from the measured values.

(2) Heat Transfer
Measured values are utilized for the reactor water level, and the core coolant flow rate is calculated from the core support plate differential pressure.

(3) Coolant
Measured values are utilized for the reactor pressure and the reactor water level.

(4) Main Steam
Measured values are utilized for the main steam flow rate, and the steam enthalpy is calculated from the reactor pressure measured value by using the steam tables.

(5) Condenser
The vacuum is obtained from the measured values.

(6) Circulation Water
The heat transfer quantity is obtained from the temperature difference of the circulation water at the inlet and outlet portions of the condenser and from the measured values of the circulation water flow rate.

(7) Exhaust Heat
Measured values of the temperature at the circulation water system outlet, the circulation water being generally disposed into the sea, are utilized.

(8) Safety Release Valve
The safety release valve steam flow rate is the product of the numbers of the valves to be opened and a calculated flow rate per independent valve. The transfer heat energy is obtained as a product of the above steam flow rate and the saturated steam enthalpy (calculated from the measured values of the reactor pressure).

(9) Reactor Containment Vessel
The pressure in the reactor containment vessel, the pool water temperature and the pool water level are obtained from the measured values.

(10) Primary Containment Vessel cooling
The heat transfer quantity is obtained from the flow rate in the cooling system now in use and the temperature difference at the high and low temperature sides of its system, respectively.

(11) Residual Heat Removal
Similarly as in the above item, this is obtained from the measured values with respect to the residual heat removal system now in use.

As described above, according to this embodiment, it becomes possible to display the information of the plant suitable for information processing for solving problems by operators, and erroneous judgement of the operators can be substantially eliminated to thereby prevent unnecessary trouble for the plant from arising.

Consequently, according to the first invention of this application, the flows of the mass and the energy at the plant start up and their balance conditions are displayed, in representation, on the display screen, and the principle and law governing the operating fluid with respect to the steam cycle are also displayed in representation on the display screen, so that it becomes possible to display the items of information of the plant suitable for the information processing for solving problems by operators, whereby a mechanism for realizing the objects of the plant can be made more clear and erroneous judgement of the operators can be prevented to thereby prevent unnecessary trouble for the plant from arising.

According to the second invention of this application, the flows of the mass and the energy during the decay heat removal operation at the plant shutdown and their balance conditions are displayed, in representation, on the display screen, and the principle and law governing the operating fluid with respect to the thermohydrodynamic behavior are also displayed in representation on the display screen, so that substantially the same effects as those referred to the above with respect to the first embodiment can be attained.

What is claimed is:

1. A plant condition display system for displaying for an operator items of information regarding the operation of a plant comprising:

a process signal input means into which process values from the plant are inputted and converted into process signals;

a display data preparation means for preparing data for displaying plant conditions in response to the process signals from the process signal input means; and a plant condition information display means for representing process information of the plant in accordance with plant condition display data from the display data preparation means and then displaying represented process information on a display screen, wherein the plant condition information display means displays starting conditions of the plant, and wherein the plant condition information display means includes means for displaying, as image representations, flows of mass and energy at plant start up and an energy balance of the plant on the display screen and means for displaying, as image representations, principles and law governing an operating fluid with respect to a steam cycle on the display screen.

2. A plant condition display system according to claim 1, wherein the plant condition information display means includes means for displaying, as image representations, main functions of total energy production and conversion processes at plant start up on the display screen and means for displaying, as image representations, conditions of supports of the main functions on the display screen.

3. A plant condition display system according to claim 2, wherein the plant condition information display means includes a core heat generation display section, a reactivity condition display section as a support thereof, a heat energy transfer function display section, a main steam pressure condition display section as a support thereof, a heat-mechanical energy conversion display section, a condenser vacuum condition display section as a support thereof, a power generation function display section, a turbine generator rotational speed condition display section as a support thereof, a heat removal function display section, a circulation water flow rate condition display section as a support thereof and an exhaust heat display section.

4. A plant condition display system according to claim 1, wherein the plant condition information display means includes a display screen having a window for displaying an advancing condition of main phases at plant start up.

5. A plant condition display system according to claim 1, wherein the plant condition information display means includes an energy flow and energy balance display means for displaying, as an image representation, an energy flow and an energy balance of the plant on a display screen.

6. A plant condition display system according to claim 5, wherein the energy flow and energy balance display means in the plant includes a display section for displaying main process variables in a reactor core, an energy balance display section for displaying an energy balance between energy inputted into and energy outputted from a reactor vessel, a turbine heat engine cycle display section and an energy sink display section for displaying electric power and exhaust heat.

7. A plant condition display system according to claim 1, wherein the plant condition information display means includes means for displaying, as image representations, a reactor vessel mass balance and a condenser mass balance on a display screen.

8. A plant condition display system for displaying for an operator items of information regarding the operation of a plant comprising:

a process signal input means into which process values from the plant are inputted and converted into process signals;

a display data preparation means for preparing data for displaying plant conditions in response to the process signals from the process signal input means; and a plant condition information display means for representing process information of the plant in accordance with plant condition display data from the display data preparation means and then displaying represented process information on a display screen, wherein the plant condition information display means displays a decay heat removal operation condition at a plant shutdown, and wherein the plant condition information display means includes a display means for displaying, as image representations, flows of mass and energy and a mass and energy balance condition of the plant in a decay heat removal operation condition at a plant shutdown time on the display screen and a display means for displaying, as image representations, principles and law governing an operating fluid with respect to thermohydrodynamic characteristics on the display screen.

9. A plant condition display system according to claim 8, wherein the plant condition information display means includes an energy flow and energy balance means for displaying, as image representations, energy flow and energy balance in the plant on a display screen.

10. A plant condition display system according to claim 9, wherein the energy flow and energy balance display means in the plant includes a display section for displaying main process variables in a reactor vessel, an energy balance display section for displaying an energy balance between energy inputted into and energy outputted from the reactor vessel, a display section for displaying thermohydrodynamic characteristics and an energy balance in a primary containment vessel and a display section for displaying the thermohydrodynamic characteristics and an energy balance in a turbine main condenser.

11. A plant condition display system according to claim 8, wherein the plant condition information display means includes a display means for displaying, as image representations, water-steam flow and a mass balance of the water-steam of the entire plant for realizing an energy flow in the plant.

12. A plant condition display system according to claim 11, wherein the display means for displaying the water-steam flow and the mass balance of the water-steam includes a reactor vessel mass balance display section, a primary containment vessel mass balance display section, a pure water storage tank mass balance display section and a condenser mass balance display section.

\* \* \* \* \*